United States Patent
Sharma et al.

(10) Patent No.: US 11,494,435 B2
(45) Date of Patent: *Nov. 8, 2022

(54) GENERATING AND DISTRIBUTING A REPLACEMENT PLAYLIST

(71) Applicant: Gracenote, Inc., Emeryville, CA (US)

(72) Inventors: Rishabh Sharma, San Francisco, CA (US); Markus Cremer, Emeryville, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,147

(22) Filed: Nov. 29, 2021

(65) Prior Publication Data

US 2022/0083593 A1     Mar. 17, 2022

Related U.S. Application Data

(63) Continuation of application No. 16/921,621, filed on Jul. 6, 2020, now Pat. No. 11,216,507, which is a
(Continued)

(51) Int. Cl.
*G06F 15/16* (2006.01)
*G06F 16/638* (2019.01)
(Continued)

(52) U.S. Cl.
CPC ............ *G06F 16/639* (2019.01); *G06F 3/165* (2013.01); *G06F 16/635* (2019.01);
(Continued)

(58) Field of Classification Search
CPC .. G06F 16/639; G06F 16/9535; G06F 16/635; G06F 16/951; G06F 3/16;
(Continued)

(56) References Cited

U.S. PATENT DOCUMENTS 6,345,250 B1   2/2002  Martin
6,351,679 B1   2/2002  Ainslie
(Continued)

FOREIGN PATENT DOCUMENTS

JP   2012008216 A   1/2012
JP   2013050479 A   3/2013
(Continued)

OTHER PUBLICATIONS

International Bureau of WIPO, International Preliminary Report on Patentability dated Sep. 15, 2016, issued in connection with International Application No. PCT/US2014/072829, 9 pages.
(Continued)

*Primary Examiner* — Duyen M Doan
(74) *Attorney, Agent, or Firm* — McDonnell Boehnen Hulbert & Berghoff LLP

(57) ABSTRACT

An embodiment may involve a server device transmitting, over a wide area network, a first playlist with a first duration to a client device. Possibly while the client device is playing out a current audio file of a first plurality of audio files in the playlist, the server device may receive an instruction from the client device and generate a second playlist. The second playlist may include references to a second plurality of audio files, where playout of the second plurality of audio files may have a duration that is less than the duration of the playout of the first plurality of audio files. The server device may transmit, over the wide area network, the second playlist to the client device. Reception of the second playlist at the client device may cause the audio player application to retrieve and play out the second plurality of audio files.

20 Claims, 13 Drawing Sheets

Related U.S. Application Data continuation of application No. 16/743,356, filed on Jan. 15, 2020, now Pat. No. 10,740,390, which is a continuation of application No. 16/383,246, filed on Apr. 12, 2019, now Pat. No. 10,579,671, which is a continuation of application No. 15/936,104, filed on Mar. 26, 2018, now Pat. No. 10,311,100, which is a continuation of application No. 15/043,085, filed on Feb. 12, 2016, now Pat. No. 9,959,343.

(60) Provisional application No. 62/274,591, filed on Jan. 4, 2016.

(51) Int. Cl.
| | |
|---|---|
| *G06F 16/635* | (2019.01) |
| *G06F 16/951* | (2019.01) |
| *G06F 16/9535* | (2019.01) |
| *H04N 21/442* | (2011.01) |
| *H04L 67/01* | (2022.01) |
| *H04L 67/60* | (2022.01) |
| *G06F 3/16* | (2006.01) |
| *G10L 13/00* | (2006.01) |
| *H04L 67/06* | (2022.01) |
| *H04L 67/10* | (2022.01) |
| *H04N 21/45* | (2011.01) |

(52) U.S. Cl.
CPC ........ *G06F 16/951* (2019.01); *G06F 16/9535* (2019.01); *G10L 13/00* (2013.01); *H04L 67/01* (2022.05); *H04L 67/06* (2013.01); *H04L 67/10* (2013.01); *H04L 67/60* (2022.05); *H04N 21/44224* (2020.08); *H04N 21/44213* (2013.01); *H04N 21/44222* (2013.01); *H04N 21/4532* (2013.01)

(58) Field of Classification Search
CPC .......... G06F 13/00; G06F 67/06; G06F 67/10; G06F 67/32; G06F 67/42
USPC ................................. 709/203, 217
See application file for complete search history.

(56) References Cited

U.S. PATENT DOCUMENTS

| | | |
|---|---|---|
| 6,438,450 B1 | 8/2002 | DiLorenzo |
| 6,460,036 B1 | 10/2002 | Herz |
| 6,721,781 B1 | 4/2004 | Bates |
| 6,738,972 B1 | 5/2004 | Willard et al. |
| 6,766,523 B2 | 7/2004 | Herley |
| 6,938,209 B2 | 8/2005 | Ogawa et al. |
| 7,006,967 B1 | 2/2006 | Kahn et al. |
| 7,013,478 B1 | 3/2006 | Hendricks et al. |
| 8,036,646 B1 | 10/2011 | Delker et al. |
| 8,281,344 B1 | 10/2012 | Mathias |
| 8,364,757 B2 | 1/2013 | Scott |
| 8,373,768 B2 | 2/2013 | Bill |
| 8,669,457 B2 | 3/2014 | Ringewald et al. |
| 8,886,655 B1 | 11/2014 | Nandy |
| 8,977,374 B1 | 3/2015 | Eck et al. |
| 8,984,147 B1 | 3/2015 | Kret et al. |
| 9,002,703 B1 | 4/2015 | Crosley |
| 9,105,300 B2 | 8/2015 | Resch |
| 9,143,718 B2 | 9/2015 | Nagorski et al. |
| 9,213,705 B1 | 12/2015 | Story, Jr. |
| 9,285,947 B1 | 3/2016 | Story, Jr. |
| 9,286,942 B1 | 3/2016 | Hayes |
| 9,355,174 B2 | 5/2016 | Moss et al. |
| 9,380,383 B2 | 6/2016 | Brenner et al. |
| 9,431,002 B2 | 8/2016 | Panguluri et al. |
| 9,454,342 B2 | 9/2016 | Panguluri et al. |
| 9,665,169 B1 | 5/2017 | Dai et al. |
| 9,798,509 B2 | 10/2017 | Panguluri et al. |
| 9,804,816 B2 | 10/2017 | Panguluri et al. |
| 9,959,343 B2 | 5/2018 | Sharma et al. |
| 10,650,038 B2 * | 5/2020 | Lewis ................. G06F 16/4387 |
| 2002/0002032 A1 | 1/2002 | Fleenor |
| 2002/0091524 A1 | 7/2002 | Guedalia et al. |
| 2002/0130898 A1 | 9/2002 | Ogawa et al. |
| 2003/0070182 A1 | 4/2003 | Pierre et al. |
| 2003/0093784 A1 | 5/2003 | Dimitrova et al. |
| 2003/0130894 A1 | 7/2003 | Huettner et al. |
| 2003/0132953 A1 | 7/2003 | Johnson |
| 2003/0151618 A1 | 8/2003 | Johnson et al. |
| 2003/0158735 A1 | 8/2003 | Yamada et al. |
| 2003/0217061 A1 | 11/2003 | Agassi |
| 2003/0217121 A1 | 11/2003 | Willis |
| 2003/0236905 A1 | 12/2003 | Choi et al. |
| 2004/0237759 A1 | 12/2004 | Bill |
| 2005/0021500 A1 | 1/2005 | Plastina et al. |
| 2005/0033582 A1 | 2/2005 | Gadd et al. |
| 2005/0097613 A1 | 5/2005 | Ulate et al. |
| 2005/0125148 A1 | 6/2005 | Van Buer et al. |
| 2005/0125232 A1 | 6/2005 | Gadd |
| 2005/0174889 A1 | 8/2005 | Marcantonio et al. |
| 2005/0182675 A1 | 8/2005 | Huettner |
| 2005/0193079 A1 | 9/2005 | Brown et al. |
| 2005/0195696 A1 | 9/2005 | Rekimoto |
| 2006/0020609 A1 | 1/2006 | LaChapelle et al. |
| 2006/0085182 A1 | 4/2006 | Eves et al. |
| 2006/0085814 A1 | 4/2006 | Okamoto et al. |
| 2006/0092282 A1 | 5/2006 | Herley et al. |
| 2006/0116965 A1 | 6/2006 | Kudo et al. |
| 2006/0143236 A1 | 6/2006 | Wu |
| 2006/0168507 A1 | 7/2006 | Hansen |
| 2006/0195513 A1 | 8/2006 | Rogers et al. |
| 2006/0236847 A1 | 10/2006 | Withop |
| 2006/0265421 A1 | 11/2006 | Ranasinghe et al. |
| 2006/0294212 A1 | 12/2006 | Kikkawa et al. |
| 2007/0016865 A1 | 1/2007 | Johnson et al. |
| 2007/0022156 A1 | 1/2007 | Grubbs |
| 2007/0036289 A1 | 2/2007 | Fu et al. |
| 2007/0050184 A1 | 3/2007 | Drucker et al. |
| 2007/0078729 A1 | 4/2007 | Brown |
| 2007/0192613 A1 | 8/2007 | Amoroso et al. |
| 2007/0198353 A1 | 8/2007 | Behringer |
| 2007/0294222 A1 | 12/2007 | Laurila et al. |
| 2007/0299870 A1 | 12/2007 | Finch |
| 2008/0028094 A1 | 1/2008 | Kang |
| 2008/0033990 A1 | 2/2008 | Hutson |
| 2008/0046948 A1 | 2/2008 | Verosub |
| 2008/0092182 A1 | 4/2008 | Conant |
| 2008/0133525 A1 | 6/2008 | Ott |
| 2008/0182670 A1 | 7/2008 | Amron |
| 2008/0189099 A1 | 8/2008 | Friedman et al. |
| 2008/0190267 A1 | 8/2008 | Rechsteiner et al. |
| 2008/0195664 A1 | 8/2008 | Maharajh et al. |
| 2008/0215624 A1 | 9/2008 | Ohashi |
| 2008/0235589 A1 | 9/2008 | Shaw |
| 2008/0256129 A1 | 10/2008 | Salinas et al. |
| 2008/0268772 A1 | 10/2008 | Linnamaki et al. |
| 2009/0063511 A1 | 3/2009 | Myers et al. |
| 2009/0099846 A1 | 4/2009 | Pickering |
| 2009/0125321 A1 | 5/2009 | Charlebois et al. |
| 2009/0158342 A1 | 6/2009 | Mercer et al. |
| 2009/0204243 A1 | 8/2009 | Marwaha et al. |
| 2009/0221248 A1 | 9/2009 | Ellis |
| 2009/0222531 A1 | 9/2009 | London et al. |
| 2009/0276064 A1 | 11/2009 | Van Gassel |
| 2009/0326953 A1 | 12/2009 | Peralta et al. |
| 2010/0004768 A1 | 1/2010 | Dunning et al. |
| 2010/0063818 A1 | 3/2010 | Mason et al. |
| 2010/0069054 A1 | 3/2010 | Labidi et al. |
| 2010/0070862 A1 | 3/2010 | Partovi |
| 2010/0082346 A1 | 4/2010 | Rogers et al. |
| 2010/0095333 A1 | 4/2010 | Kelly |
| 2010/0114853 A1 | 5/2010 | Fisher et al. |
| 2010/0129058 A1 | 5/2010 | Koyano |
| 2010/0241963 A1 | 9/2010 | Kulis et al. |
| 2010/0251098 A1 | 9/2010 | Rehki et al. |
| 2010/0268821 A1 | 10/2010 | Pau |
| 2010/0322413 A1 | 12/2010 | Matsushima et al. |

(56) References Cited

U.S. PATENT DOCUMENTS

| | | |
|---|---|---|
| 2011/0022594 A1 | 1/2011 | Takatsuka et al. |
| 2011/0066941 A1 | 3/2011 | Chipchase |
| 2011/0112671 A1 | 5/2011 | Weinstein |
| 2011/0123176 A1 | 5/2011 | Fujiwara et al. |
| 2011/0167390 A1 | 7/2011 | Reed, Jr. et al. |
| 2011/0285547 A1 | 11/2011 | Crowe |
| 2011/0320443 A1 | 12/2011 | Ray et al. |
| 2012/0057842 A1 | 3/2012 | Caligor et al. |
| 2012/0110126 A1 | 5/2012 | Sparks |
| 2012/0130817 A1 | 5/2012 | Bousaleh et al. |
| 2012/0159336 A1 | 6/2012 | Norwood |
| 2012/0185070 A1 | 7/2012 | Hagg et al. |
| 2012/0203838 A1 | 8/2012 | Zuckerberg |
| 2012/0236201 A1 | 9/2012 | Larsen et al. |
| 2012/0240045 A1 | 9/2012 | Bradley et al. |
| 2012/0245982 A1 | 9/2012 | Daniel |
| 2012/0253952 A1 | 10/2012 | Rafenomanjato |
| 2013/0022131 A1 | 1/2013 | Ocon et al. |
| 2013/0031216 A1 | 1/2013 | Willis |
| 2013/0076651 A1 | 3/2013 | Reimann |
| 2013/0103496 A1 | 4/2013 | Shekar et al. |
| 2013/0109340 A1 | 5/2013 | Williams |
| 2013/0152125 A1 | 6/2013 | Xiong et al. |
| 2013/0173796 A1 | 7/2013 | Grab et al. |
| 2013/0198268 A1 | 8/2013 | Hyman |
| 2013/0216055 A1 | 8/2013 | Wanca |
| 2013/0231931 A1 | 9/2013 | Kulis et al. |
| 2013/0253833 A1 | 9/2013 | Tuukkanen |
| 2013/0297599 A1 | 11/2013 | Henshall |
| 2013/0302011 A1 | 11/2013 | Nagorski et al. |
| 2013/0304822 A1 | 11/2013 | Tetreault |
| 2014/0006559 A1 | 1/2014 | Drapeau et al. |
| 2014/0074846 A1 | 3/2014 | Moss et al. |
| 2014/0074924 A1 | 3/2014 | Yim et al. |
| 2014/0108141 A1 | 4/2014 | Zigler et al. |
| 2014/0115463 A1 | 4/2014 | Reznor et al. |
| 2014/0122080 A1 | 5/2014 | Kaszczuk |
| 2014/0178043 A1 | 6/2014 | Kritt et al. |
| 2014/0245346 A1 | 8/2014 | Cheng et al. |
| 2014/0281973 A1* | 9/2014 | Klappert .................. G06F 3/01 715/716 |
| 2014/0281976 A1 | 9/2014 | Chia et al. |
| 2014/0282755 A1 | 9/2014 | Alsina et al. |
| 2014/0330848 A1 | 11/2014 | Chen et al. |
| 2014/0366047 A1 | 12/2014 | Thomas et al. |
| 2015/0062623 A1 | 3/2015 | Yano et al. |
| 2015/0222680 A1 | 8/2015 | Grover |
| 2015/0244805 A1 | 8/2015 | Hampiholi et al. |
| 2015/0254050 A1 | 9/2015 | Pangulur et al. |
| 2015/0254051 A1 | 9/2015 | Pangulur et al. |
| 2015/0255055 A1 | 9/2015 | Panguluri |
| 2015/0255056 A1 | 9/2015 | Panguluri et al. |
| 2015/0261387 A1 | 9/2015 | Petersen et al. |
| 2015/0262229 A1 | 9/2015 | Brenner et al. |
| 2015/0296228 A1 | 10/2015 | Chen et al. |
| 2015/0302017 A1 | 10/2015 | Provost et al. |
| 2015/0319479 A1 | 11/2015 | Mishra et al. |
| 2015/0334170 A1 | 11/2015 | Panguluri |
| 2015/0334172 A1* | 11/2015 | Ravi .................. H04L 67/10 709/217 |
| 2015/0348532 A1 | 12/2015 | Cameron et al. |
| 2015/0373138 A1 | 12/2015 | Brenner et al. |
| 2015/0378320 A1 | 12/2015 | Knight et al. |
| 2015/0381923 A1 | 12/2015 | Wickenkamp et al. |
| 2016/0066004 A1 | 3/2016 | Lieu et al. |
| 2016/0066140 A1 | 3/2016 | Gnanasekaran |
| 2016/0179087 A1 | 6/2016 | Lee |
| 2016/0196735 A1 | 7/2016 | Clayman |
| 2016/0328471 A1 | 11/2016 | Goldin et al. |
| 2016/0373197 A1 | 12/2016 | Brenner et al. |
| 2017/0006128 A1 | 1/2017 | Graham-Cumming |
| 2017/0041680 A1 | 2/2017 | Lewis et al. |
| 2017/0075701 A1 | 3/2017 | Ricci et al. |
| 2017/0115952 A1 | 4/2017 | Gregory |
| 2017/0187862 A1 | 6/2017 | Rahman et al. |
| 2017/0300293 A1 | 10/2017 | Zhao |
| 2017/0344336 A1 | 11/2017 | Lotfizadeh |
| 2018/0096064 A1 | 4/2018 | Lennon et al. |
| 2018/0160195 A1* | 6/2018 | Redmond .......... G06Q 30/0251 |

FOREIGN PATENT DOCUMENTS

| | | |
|---|---|---|
| JP | 2013127834 A | 6/2013 |
| KR | 1020100000249 | 1/2010 |
| KR | 1020110117496 | 10/2011 |
| KR | 1020140014664 | 2/2014 |
| KR | 1020140126556 | 10/2014 |
| WO | 2005/050652 | 6/2005 |
| WO | 2015/134094 | 9/2015 |
| WO | 2015/134097 | 9/2015 |
| WO | 2015/134102 | 9/2015 |
| WO | 2015/134104 | 9/2015 |
| WO | 2015/138601 | 9/2015 |
| WO | 2017/120008 | 7/2017 |
| WO | 2017/120009 | 7/2017 |

OTHER PUBLICATIONS

International Bureau of WIPO, International Preliminary Report on Patentability dated Sep. 15, 2016, issued in connection with International Application No. PCT/US2014/072111, 9 pages.
International Bureau of WIPO, International Preliminary Report on Patentability dated Sep. 15, 2016, issued in connection with International Application No. PCT/US2014/072812, 10 pages.
International Bureau of WIPO, International Preliminary Report on Patentability dated Sep. 15, 2016, issued in connection with International Application No. PCT/US2014/072652, 8 pages.
Australian Government, IP Australia, Notice of Acceptance for Patent Application dated Dec. 14, 2017, issued in connection with Australian Application No. 2014385236, 3 pages.
Final Office Action dated Jun. 5, 2018, issued in connection with U.S. Appl. No. 15/223,278, filed Jul. 29, 2016, 22 pages.
Final Office Action dated Apr. 20, 2018, issued in connection with U.S. Appl. No. 15/043,073, filed Feb. 12, 2016, 27 pages.
Non-Final Office Action dated Apr. 3, 2018, issued in connection with U.S. Appl. No. 15/043,059, filed Feb. 12, 2016, 28 pages.
Notice of Allowance dated Mar. 22, 2018, issued in connection with U.S. Appl. No. 15/043,085, filed an Feb. 12, 2016, 9 pages.
Notice of Allowance dated May 31, 2018, issued in connection with U.S. Appl. No. 15/387,345, filed or Dec. 21, 2016, 10 pages.
Australian Government, IP Australia, Notice of Acceptance for Patent Application dated Aug. 10, 2017, issued in connection with Australian Application No. 2014385186, 3 pages.
Non-Final Office Action dated Aug. 3, 2018, issued in connection with for U.S. Appl. No. 15/043,073, filed Feb. 12, 2016, pp. 1-27.
Korean Intellectual Property Office Notice of Preliminary Rejection for Japanese Patent No. 10-2018-7019197 dated Aug. 9, 2019, pp. 1-14 with English translation.
Notice of Allowance dated Feb. 1, 2019, issued in connection with U.S. Appl. No. 16/002,454, filed Jun. 7, 2018, 10 pages.
Non-Final Office Action dated May 13, 2020, issued in connection with U.S. Appl. No. 16/235,773, filed Dec. 28, 2018, 10 pages.
Non-Final Office Action dated Apr. 9, 2020, issued in connection with U.S. Appl. No. 16/447,496, filed Jun. 20, 2019, 13 pages.
Final Office Action dated May 19, 2020, issued in connection with U.S. Appl. No. 16/447,496, filed Jun. 20, 2019, 15 pages.
Final Office Action dated Apr. 1, 2020, issued in connection with U.S. Appl. No. 16/514,555, filed Jul. 17, 2019, 23 pages.
Korean Intellectual Property Office Notice of Final Rejection to Patent Application dated Jan. 27, 2022 for Korean Patent Application No. 10-2021-7011825 filed Apr. 21, 2021, 8 pages.
Non-Final Office Action dated Jan. 15, 2019, issued in connection with U.S. Appl. No. 15/387,327, filed Dec. 21, 2016, 24 pages.
Non-Final Office Action dated Jan. 22, 2019, issued in connection with U.S. Appl. No. 15/387,351, filed Dec. 21, 2016, 27 pages.
Official Action dated Jul. 14, 2021, in corresponding Korean Application No. 10-2021-7011825, filed Apr. 21, 2021, 11 pages.

(56) References Cited

OTHER PUBLICATIONS

Non-Final Office Action dated Nov. 30, 2020, issued in connection with U.S. Appl. No. 16/294,261, filed Mar. 6, 2019, 18 pages.
India Intellectual Property, Examination Report dated Nov. 3, 2020, in corresponding Indian Patent Application No. 201847023321 filed Jun. 22, 2018, 6 pages.
India Intellectual Property, Examination Report dated Oct. 12, 2020, in corresponding Indian Patent Application No. 201847023325 filed Jun. 22, 2018, 6 pages.
Final Office Action dated Jan. 8, 2016, issued in connection with U.S. Appl. No. 14/196,908, filed Mar. 4, 2014, 50 pages.
Advisory Action dated Mar. 18, 2016, issued in connection with U.S. Appl. No. 14/196,908, filed Mar. 4, 2014, 3 pages.
Advisory Action dated Apr. 26, 2016, issued in connection with U.S. Appl. No. 14/196,932, filed Mar. 4, 2014, 8 pages.
Advisory Action dated Mar. 28, 2016, issued in connection with U.S. Appl. No. 14/196,774, filed Mar. 4, 2014, 14 pages.
Final Office Action dated Jan. 21, 2016, issued in connection with U.S. Appl. No. 14/196,774, filed Mar. 4, 2014, 20 pages.
Final Office Action dated Feb. 9, 2017, issued in connection with U.S. Appl. No. 14/196,774, filed Mar. 4, 2014, 22 pages.
Harris, Melissa, "Pandora-like news radio app about to launch," Chicago Tribune website (http://articles.chicagotribune.com/2013-12-01/business/ct-biz-1201-confidential-levy-20131201_1_traffic-report-traffic-information-app), Dec. 1, 2013, 4 pages.
International Searching Authority, International Search Report and Written Opinion dated Mar. 17, 2015, issued in connection with International Patent Application No. PCT/US2014/072829, filed on Dec. 30, 2014, 12 pages.
International Searching Authority, International Search Report and Written Opinion dated Mar. 25, 2015, issued in connection with International Patent Application No. PCT/US2014/072111, filed on Dec. 23, 2014, 12 pages.
International Searching Authority, International Search Report and Written Opinion dated Mar. 31, 2015, issued in connection with International Patent Application No. PCT/US2014/072812, filed on Dec. 30, 2014, 13 pages.
International Searhcing Authority, International Search Report and Written Opinion dated Mar. 18, 2015, issued in connection with International Application No. PCT/US2014/072652, filed on Dec. 30, 2014, 12 pages.
International Searhcing Authority, International Search Report and Written Opinion dated Apr. 22, 2015, issued in connection with International Application No. PCT/US2014/072653, filed on Dec. 30, 2014, 11 pages.
International Searching Authority, International Search Report and Written Opinion dated Mar. 17, 2017, issued in connection with International Patent Application No. PCT/US2016/066961, filed on Dec. 15, 2016, 15 pages.
Non-Final Office Action dated Feb. 1, 2016, issued in connection with U.S. Appl. No. 14/196,870, filed Mar. 4, 2014, 14 pages.
Non-Final Office Action dated Sep. 3, 2015, issued in connection with U.S. Appl. No. 14/196,908, filed Mar. 4, 2014, 41 pages.
Non-Final Office Action dated Oct. 5, 2016, issued in connection with U.S. Appl. No. 14/196,932, filed Mar. 4, 2014, 22 pages.
Non-Final Office Action dated Jul. 16, 2015, issued in connection with U.S. Appl. No. 14/196,932, filed Mar. 4, 2014, 18 pages.
Non-Final Office Action dated Apr. 20, 2017, issued in connection with U.S. Appl. No. 15/244,561, filed Aug. 23, 2016, 7 pages.
Non-Final Office Action dated Jun. 23, 2016, issued in connection with U.S. Appl. No. 14/196,774, filed Mar. 4, 2014, 18 pages.
Non-Final Office Action dated Aug. 25, 2015, issued in connection with U.S. Appl. No. 14/196,774, filed Mar. 4, 2014, 19 pages.
Notice of Allowance dated Aug. 15, 2016, issued in connection with U.S. Appl. No. 14/196,870, filed Mar. 4, 2014, 5 pages.
Notice of Allowance dated Jul. 19, 2016, issued in connection with U.S. Appl. No. 14/196,908, filed Mar. 4, 2014, 11 pages.
Non-Final Office Action dated Sep. 11, 2017, issued in connection with U.S. Appl. No. 15/043,073, filed Feb. 12, 2016, 24 pages.
Printout of website relating to "Rivet News Radio" app, printed Mar. 4, 2014, 2 pages.
Printout of website relating to "Stitcher Radio for Podcasts" app, printed Mar. 4, 2014, 4 pages.
Printout of website relating to "Swell FAQs", printed Mar. 4, 2014, 6 pages.
Printout of website relating to "Swell Radio for News and Podcasts" app, printed Mar. 4, 2014, 3 pages.
Supplemental Notice of Allowability dated Jul. 27, 2016, issued in connection with U.S. Appl. No. 14/196,908, filed Mar. 4, 2014, 6 pages.
International Searching Authority, International Search Report and Written Opinion dated Apr. 10, 2017, issued in connection with International Application No. PCT/US2016/066943, filed on Dec. 15, 2016, 12 pages.
Advisory Action dated Apr. 18, 2017, issued in connection with U.S. Appl. No. 14/196,774, filed Mar. 4, 2014, 4 pages.
Canadian Intellectual Property Office, Office Action dated Apr. 20, 2017, issued in connection with Canadian Application No. 2939311, 4 pages.
Notice of Allowance dated May 11, 2017, issued in connection with U.S. Appl. No. 14/196,932, filed Mar. 4, 2014, 7 pages.
Non-Final Office Action dated May 17, 2017, issued in connection with U.S. Appl. No. 15/223,278, filed Jul. 29, 2016, 32 pages.
Advisory Action dated Dec. 29, 2017, issued in connection with U.S. Appl. No. 15/223,278, filed Jul. 29, 2016, 3 pages.
Non-Final Office Action dated Jan. 31, 2018, issued in connection with U.S. Appl. No. 15/223,278, filed Jul. 29, 2016, 30 pages.
Non-Final Office Action dated Mar. 14, 2018, issued in connection with U.S. Appl. No. 15/387,345, filed Dec. 21, 2016, 15 pages.
Final Office Action dated Oct. 25, 2017, issued in connection with U.S. Appl. No. 15/223,278, filed Jul. 29, 2016, 33 pages.
Non-Final Office Action dated Oct. 31, 2017, issued in connection with U.S. Appl. No. 15/043,085, filed Feb. 12, 2016, 13 pages.
Australian Government, IP Australia, Examination Report No. 1 dated Aug. 21, 2017, issued in connection with Australian Application No. 2014385236, 3 pages.
Australian Government, IP Australia, Examination Report No. 1 dated May 25, 2017, issued in connection with Australian Application No. 2014385186, 2 pages.
Australian Government, IP Australia, Notice of Acceptance for Patent Application dated May 23, 2017, Bsued in connection with Australian Application No. 2014385233, 3 pages.
Australian Government, IP Australia, Examination Report No. 1 dated Feb. 17, 2017, issued in connection with Australian Application No. 2014385233, 4 pages.
Canadian Intellectual Property Office, Office Action dated Oct. 23, 2017, issued in connection with Canadian Application No. 2940394, 4 pages.
Corrected Notice of Allowability dated Sep. 20, 2017, issued in connection with U.S. Appl. No. 14/196,932, filed Mar. 4, 2014, 2 pages.
Corrected Notice of Allowability dated Sep. 22, 2017, issued in connection with U.S. Appl. No. 15/244,561, filed Aug. 23, 2016, 2 pages.
European Patent Office, Extended European Search Report dated Nov. 3, 2017, issued in European Application No. 14884480, 10 pages.
European Patent Office, Extended European Search Report dated Oct. 30, 2017, issued in European Application No. 14/884,638, 9 pages.
Final Office Action dated Jan. 29, 2016, issued in connection with U.S. Appl. No. 14/196,932, filed Mar. 4, 2014, 20 pages.
Notice of Allowance dated Aug. 31, 2017, issued in connection with U.S. Appl. No. 15/244,561, filed Aug. 23, 2016, 5 pages.
European Patent Office, Supplementary European Search Report dated Jul. 13, 2017, issued in European Application No. 14884483, 11 pages.
Non-Final Office Action, U.S. Appl. No. 17/237,640, dated Jun. 8, 2022, 14 pages.
Notice of Preliminary Rejection, Korean Intellectual Property Office, Application No. KR 10-2022-7004830, dated May 20, 2022, 8 pages (English language translation included).

(56) References Cited

OTHER PUBLICATIONS

Non-Final Office Action, U.S. Appl. No. 17/342,150, dated Jul. 11, 2022, 18 pages.
Non-Final Office Action, Issued in U.S. Appl. No. 17/237,640 dated Aug. 16, 2022, 9 pages.
Decision of Patent Grant Application No. JP 2021-067528, dated Aug. 24, 2020 (English translation included).
Decision of Patent Grant Application No. JP 2021-079507, dated Jul. 28, 2020 (English translation included).

* cited by examiner

|  | HAPPINESS | SADNESS | HUMOR | TRAGEDY | ANGER | FRUSTRATION | ANXIETY | LONELINESS | CONFUSION | EXCITEMENT | HOPE | RELAXATION |
|---|---|---|---|---|---|---|---|---|---|---|---|---|
| HAPPINESS | ✓ | x | ✓ | x | x | x |  | x |  |  |  |  |
| SADNESS | x | ✓ | x | ✓ |  |  |  |  |  | x | x |  |
| HUMOR | ✓ | x | ✓ | x |  |  |  |  |  |  |  |  |
| TRAGEDY | x | ✓ | x | ✓ |  |  |  |  |  |  |  |  |
| ANGER | x |  |  |  | ✓ | ✓ |  |  |  |  |  |  |
| FRUSTRATION | x |  |  |  | ✓ | ✓ | ✓ |  |  |  |  | x |
| ANXIETY |  | ✓ |  |  |  | ✓ | ✓ |  |  |  |  | x |
| LONELINESS | x |  |  |  |  |  |  | ✓ |  |  |  |  |
| CONFUSION |  |  |  |  |  |  |  |  | ✓ |  |  |  |
| EXCITEMENT |  | x |  | x |  |  |  |  |  | ✓ | x | x |
| HOPE |  | x |  |  |  |  |  |  |  | x | ✓ | x |
| RELAXATION |  |  |  |  |  |  | x |  | x | x |  | ✓ |

FIG. 8

GENERATING AND DISTRIBUTING A REPLACEMENT PLAYLIST

CROSS-REFERENCE TO RELATED APPLICATIONS

This application is a continuation of and claims priority to U.S. patent application Ser. No. 16/921,621, filed Jul. 6, 2020, which is hereby incorporated by reference in its entirety.

U.S. patent application Ser. No. 16/921,621 is a continuation of and claims priority to U.S. patent application Ser. No. 16/743,356, filed Jan. 15, 2020, which is hereby incorporated by reference in its entirety.

U.S. patent application Ser. No. 16/743,356 is a continuation of and claims priority to U.S. patent application Ser. No. 16/383,246, filed Apr. 12, 2019, which is hereby incorporated by reference in its entirety.

U.S. patent application Ser. No. 16/383,246 is a continuation of and claims priority to U.S. patent application Ser. No. 15/936,104, filed Mar. 26, 2018, which is hereby incorporated by reference in its entirety.

U.S. patent application Ser. No. 15/936,104 is a continuation of and claims priority to U.S. patent application Ser. No. 15/043,085, filed Feb. 12, 2016, which is hereby incorporated by reference in its entirety.

U.S. patent application Ser. No. 15/043,085 claims priority to U.S. provisional patent application No. 62/274,591, filed Jan. 4, 2016, which is hereby incorporated by reference in its entirety.

BACKGROUND

To listen to the radio, a listener typically tunes a receiver to a particular frequency (e.g., an AM or FM frequency, or a satellite frequency) and listens to music, news, or other audible content being broadcasted on that frequency by a radio station. The radio station generates programs of audible content that are transmitted to all listeners simultaneously. These programs may be generated in advance, or may be generated in real-time or in an ad hoc fashion. In some cases, this can lead to situations where there is a thematic or emotional mismatch between individual units of the audible content that make up the playlist. Or, the playlist may inadvertently contain material that could be offensive to particular listeners, or could be considered insensitive based on current events.

SUMMARY

The embodiments herein disclose various mechanisms for generating playlists such that the audible content referenced therein has some form of thematic association or is arranged to be of an approximate length. For instance, music, news, and/or advertising content may be selected based on a particular user's preferences or information known about that user. At least some of these units of audible content may be selected based on properties of preceding or following units so that there is thematic continuity from unit to unit of the playlist.

In some cases, this may mean that an attribute of an audio file containing music (e.g., an artist name, a song title or lyrical content) may be used to choose an audio file containing a story (e.g., a news story). Conversely, the content of an audio file containing a story may be used to choose an audio file containing music. In a playlist, a reference to the audio file containing the story may be ordered before or after a reference to the audio file containing music.

Accordingly, a first example embodiment may involve, possibly based on a profile associated with a client device, a server device selecting an audio file containing music. The client device and the server device may be in communication with one another by way of a wide-area network, and the client device may include an audio player application. Possibly based on an attribute associated with the audio file containing the music, the server device may select an audio file containing a story. The server device may generate a playlist for the client device, where the playlist includes (i) a reference to the audio file containing the music, and (ii) a reference to the audio file containing the story. The server device may transmit the playlist to the client device over the wide area network. Reception of the playlist at the client device may cause the audio player application to retrieve and play out each of the audio file containing the music and the audio file containing the story.

A second example embodiment may involve, possibly based on a profile associated with a client device, a server device selecting a text file containing a story. The client device and a server device may be in communication with one another by way of a wide-area network, and the client device may include an audio player application. Possibly based on text within the text file containing the story, the server device may select an audio file containing music. An automatic text-to-speech system may convert the text file containing the story to an audio file containing the story. The server device may generate a playlist for the client device, where the playlist includes (i) a reference to the audio file containing the music, and (ii) a reference to the audio file containing the story. The server device may transmit the playlist, over the wide area network, to the client device. Reception of the playlist at the client device may cause the audio player application to retrieve and play out each of the audio file containing the music and the audio file containing the story.

In other cases, an audio file a story may be parsed or scanned for keywords (e.g., after processing by an automatic speech-to-text system). Based on the presence or absence of certain keywords, a mood of the story (e.g., happiness, sadness, humor, tragedy) may be determined. In some embodiments, a semantic analysis may be performed on the story in part or as a whole, and the mood of the story may be based on this analysis.

An audio file containing music may be chosen such that the audio file has the same or a similar mood, or at least a mood that is based on the mood of the story. Conversely, a mood associated with an audio file containing music may be used to choose an audio file containing a story. In a playlist, a reference to the audio file containing the story may be ordered before or after a reference to the audio file containing music.

Thus, a third example embodiment may involve a server device obtaining an audio file containing a story. A client device and the server device may be in communication with one another by way of a wide-area network, and the client device may include an audio player application. Possibly based on an attribute associated with the audio file containing the story and/or a sematic analysis of the story, the server device may determine a mood of the story. Possibly based on the mood of the story, the server device may select an audio file containing music, where the audio file containing the music is associated with an attribute that is indicative of the mood. The server device may generate a playlist for the client device, where the playlist includes (i) a reference to the audio file containing the music, and (ii) a reference to the audio file containing the story. The server device may transmit the playlist, over the wide area network, to the client device. Reception of the playlist at the client device may cause the audio player application to retrieve and play out each of the audio file containing the music and the audio file containing the story.

A fourth example embodiment may involve a server device obtaining an audio file containing music. A client device and the server device may be in communication with one another by way of a wide-area network, and the client device may include an audio player application. Possibly based on an attribute associated with the audio file containing the music, the server device may determine a mood of the music. Possibly based on the mood of the music, the server device may select an audio file containing a story. An attribute associated with the audio file containing the story, and/or a semantic analysis of the story, may be indicative of the mood. The server device may generate a playlist for the client device, where the playlist includes (i) a reference to the audio file containing the music, and (ii) a reference to the audio file containing the story. The server device may transmit, over the wide area network, the playlist to the client device. Reception of the playlist at the client device may cause the audio player application to retrieve and play out each of the audio file containing the music and the audio file containing the story.

In further embodiments, a client device may be retrieving and playing out audio files from a playlist generated by a server device. In response to an input received by the client device, the client device may determine that the playout should end in a certain amount of time. For instance, a user may have activated a timer function at the client device such that the client device is to terminate playout in a particular number of minutes. In response to this input, the client device may instruct the server device to generate a new playlist that ends after approximately the particular number of minutes. The server device may generate and provide this new playlist to the client device, and the client device may begin retrieving and playing out audio files from the new playlist. In some embodiments, the timer may be a sleep timer and audio files referenced by the new playlist may be selected and/or arranged so that they are conducive to sleep. In other embodiments, the timer may measure the amount of time remaining until a destination is reached, or until an event occurs (e.g., the arrival or a bus or train, or the beginning of an appointment).

Accordingly, a fifth example embodiment may involve a server device generating a first playlist for a client device. The first playlist may include references to a first plurality of audio files in a first specified order. Playout of the first plurality of audio files may have a first duration. The client device and the server device may be in communication with one another by way of a wide-area network, and the client device may include an audio player application. The server device may transmit, over the wide area network, the first playlist to the client device. Reception of the first playlist at the client device may cause the audio player application to retrieve and play out at least some of the first plurality of audio files in the first specified order. Possibly while the client device is playing out a current audio file of the first plurality of audio files, the server device may receive an instruction from the client device. Possibly in response to receiving the instruction, the server device may generate a second playlist. The second playlist may include references to a second plurality of audio files in a second specified order, where playout of the second plurality of audio files may have a second duration that is less than the first duration. The server device may transmit, over the wide area network, the second playlist to the client device. Reception of the second playlist at the client device may cause the audio player application to retrieve and play out the second plurality of audio files in the second specified order.

In a sixth example embodiment, an article of manufacture may include a non-transitory computer-readable medium, having stored thereon program instructions that, upon execution by a computing device, cause the computing device to perform operations in accordance with the first, second, third, fourth, and/or fifth example embodiments.

In a seventh example embodiment, a computing device may include at least one processor, as well as memory and program instructions. The program instructions may be stored in the memory, and upon execution by the at least one processor, cause the computing device to perform operations in accordance with the first, second, third, fourth, and/or fifth example embodiments.

In an eighth example embodiment, a system may include various means for carrying out each of the operations of the first, second, third, fourth, and/or fifth example embodiments.

Although examples described herein attribute certain acts to certain devices, any device or devices could perform those acts. For instance, some or all of the acts attributed to a "server device" above could be performed by different server devices and/or a client device.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8 is a table of relationships between moods, according to an example embodiment.

DETAILED DESCRIPTION

Figure 1:
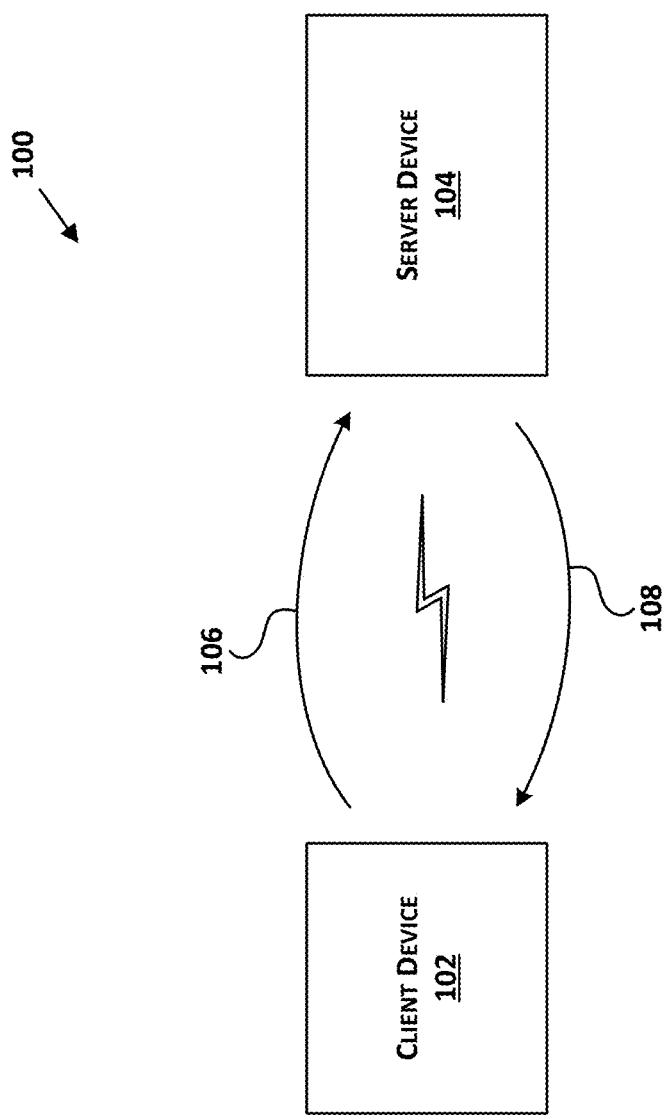
FIG. 1 is a high-level depiction of a client-server computing system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations. For instance, steps, blocks, or acts assigned to a particular device (e.g., a server device) may be carried out by components of another device (e.g., a client device) in alternative embodiments.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

1. Overview

Unlike traditional broadcast radio, online (e.g., Internet-based) radio can transmit audio content to individual client devices or groups of client devices. Thus, this audio content can be personalized for distinct users or groups of users. For instance, a server device may generate a playlist based on known attributes or preferences of one or more users. This playlist may contain a sequence of references (e.g., uniform resource locators, or URLs) to one or more remote audio files. Such a playlist may be transmitted to a client device of the user(s). The client device may traverse the playlist, retrieving and playing out the audio files. In doing so, the client device may either download one or more of the audio files (from the server device or a different device) prior to playing them out, or may receive the audio files as a stream.

Herein, a download of an audio file may refer to a client device obtaining the entire audio file from a server device before beginning to play out any part of the audio file. The streaming of an audio file, on the other hand, may involve the client device receiving one portion of the audio file while simultaneously playing out another, previously-received, portion of the audio file.

As an example, after or as the server device generates a playlist, the server device may transmit the playlist to the client device, and the client device may traverse the entries of the playlist. In doing so, the client device may retrieve data representing each referenced audio file, and play out the audio files in accordance with the sequence defined by the playlist. Thus, for each reference in the sequence defined by the playlist, (i) the client device may transmit, to the server device (or a different device), a request for the referenced audio file, (ii) the server device may receive the transmitted request, (iii) responsive to the server device receiving the transmitted request, the server device may transmit to the client, a stream of the requested audio file, (iv) the client device may begin receiving and buffering the stream of the audio file, and (v) while still receiving the stream of the audio file, the client device may play out the received portion of the audio file. In this way, a user may be provided with a substantially continuous playout of the audio files referenced by the playlist.

Despite the advantages of personalizing audio programming, computerized generation of playlists can lead to certain challenges. For instance, computer-generated playlists might not exhibit thematic continuity from audio file to audio file. As a consequence, the selecting and ordering of the audio files may appear to be random even though these audio files may have been selected based (in one way or another) on a user's profile.

The embodiments herein facilitate selection of audio files for inclusion in a playlist, and the ordering thereof, to be based on thematic association. Thus, the topic of a news story may influence selection of music that follows the news story in the sequence. Likewise, characteristics of music (e.g., determined based on, tempo, volume, artist name, song title, and/or lyrical content) may influence the selection of a news story that follows the music in the sequence. In some cases, more than one of such characteristics may be combined to determine an overall similarity between the content of two or more audio files. Alternatively or additionally, the characteristic used may be different in various parts of the playlist. For instance, artist name may be used as the similarity characteristic between the first three entries, song title may be used as the similarity characteristic between next the four entries, and so on.

Further, the mood of a news story (e.g., happy, sad, tragic, humorous) may influence the selection of music that follows the news story in the sequence. Likewise, the mood of music may influence the selection of a news story that follows the music in the sequence. In some cases, the server device may try to match the moods of the news story and the music, or the server device may select the moods of the news story and the music so that these moods are not opposed to one another. In other cases, the server device may select these moods so that they are opposed to one another. Generally speaking, the server device may select one of the news story and the music such that its mood is based, in some fashion, on the mood of the other.

In various embodiments, news stories may initially exist in a text format (e.g., a flat text file or a markup language file). When a news story is selected for inclusion in a playlist, the server device may determine whether an audio version of the news story exists, and if not, the server device may use text-to-speech (e.g., speech generation) technology to automatically generate an audio file of the news story. Conversely, to determine the mood of a news story in an audio file format, the server device may use speech-to-text (e.g., speech recognition) technology to automatically generate a text file of the news story. Then, the mood of the news story may be determined based on the content of the text file.

In some embodiments, the server device may have generated a playlist, and a client device may be playing out the audio files referenced in the playlist. The server device may receive, from the client device, an indication that the client device has been instructed to terminate playout of audio at some point in the future. For instance, the user of the client device may have activated a sleep timer function of the client device. In response, the server device may generate a new playlist that approximately matches the length of time remaining before the client device is scheduled to terminate playout. Media referenced by this new playlist may be selected and ordered so that the listener is eased to sleep as the playout approaches its end. For example, the dynamic range of the media may become progressively narrower, and/or the tempo of the audio may become progressively slower. In other embodiments, the timer may measure the amount of time remaining until a destination is reached, or until an event occurs (e.g., the arrival or a bus or train, or the beginning of an appointment).

Any of the embodiments described above, or elsewhere herein, may be combined in various ways. Thus, in some implementations, a new playlist generated in response to activation of the aforementioned timer function may be populated with thematically associated media.

While the embodiments described herein focus on generating playlists of audio files for audio playout, the same or similar embodiments can be used to generate playlists of audio/video files (e.g., television news programs, entertainment programs, commercials, movies, etc.) for audio/video playout. Thus, the described embodiments are not limited to audio files and may be applied to other types of media.

Regardless of how they may be implemented, the embodiments herein may make use of one or more computing devices. These computing devices may include, for example, client devices under the control of users, and server devices that directly or indirectly interact with the client devices. Such devices are described in the following section.

2. Example Computing Devices and Cloud-Based Computing Environments

FIG. 1 illustrates an example communication system 100 for carrying out one or more of the embodiments described herein. Communication system 100 may include computing devices. Herein, a "computing device" may refer to either a client device, a server device (e.g., a stand-alone server computer or networked cluster of server equipment), or some other type of computational platform.

Client device 102 may be any type of device including a personal computer, laptop computer, a wearable computing device, a wireless computing device, a head-mountable computing device, a mobile telephone, or tablet computing device, etc., that is configured to transmit data 106 to and/or receive data 108 from a server device 104 in accordance with the embodiments described herein. For example, in FIG. 1, client device 102 may communicate with server device 104 via one or more wireline or wireless interfaces. In some cases, client device 102 and server device 104 may communicate with one another via a local-area network. Alternatively, client device 102 and server device 104 may each reside within a different network, and may communicate via a wide-area network, such as the Internet.

Client device 102 may include a user interface, a communication interface, a main processor, and data storage (e.g., memory). The data storage may contain instructions executable by the main processor for carrying out one or more operations, such as operations relating to the data sent to, or received from, server device 104, and/or other operations disclosed herein. The user interface of client device 102 may include buttons, a touchscreen, a microphone, and/or any other elements for receiving inputs, as well as a speaker, one or more displays, and/or any other elements for communicating outputs.

Server device 104 may be any entity or computing device arranged to carry out the server operations described herein.

Further, server device 104 may be configured to send data 108 to and/or receive data 106 from the client device 102.

Data 106 and data 108 may take various forms. For example, data 106 and 108 may represent packets transmitted by client device 102 or server device 104, respectively, as part of one or more communication sessions. Such a communication session may include packets transmitted on a signaling plane (e.g., session setup, management, and teardown messages), and/or packets transmitted on a media plane (e.g., text, graphics, audio, and/or video data). For instance, data 106 may include transmissions of requests for playlists and audio file streams, while data 108 may include, in response to these requests, transmissions of playlists and audio file streams, respectively.

Regardless of the exact architecture, the operations of client device 102, server device 104, as well as any other operation associated with the architecture of FIG. 1, can be carried out by one or more computing devices. These computing devices may be organized in a standalone fashion, in cloud-based (networked) computing environments, or in other arrangements.

Figure 2:
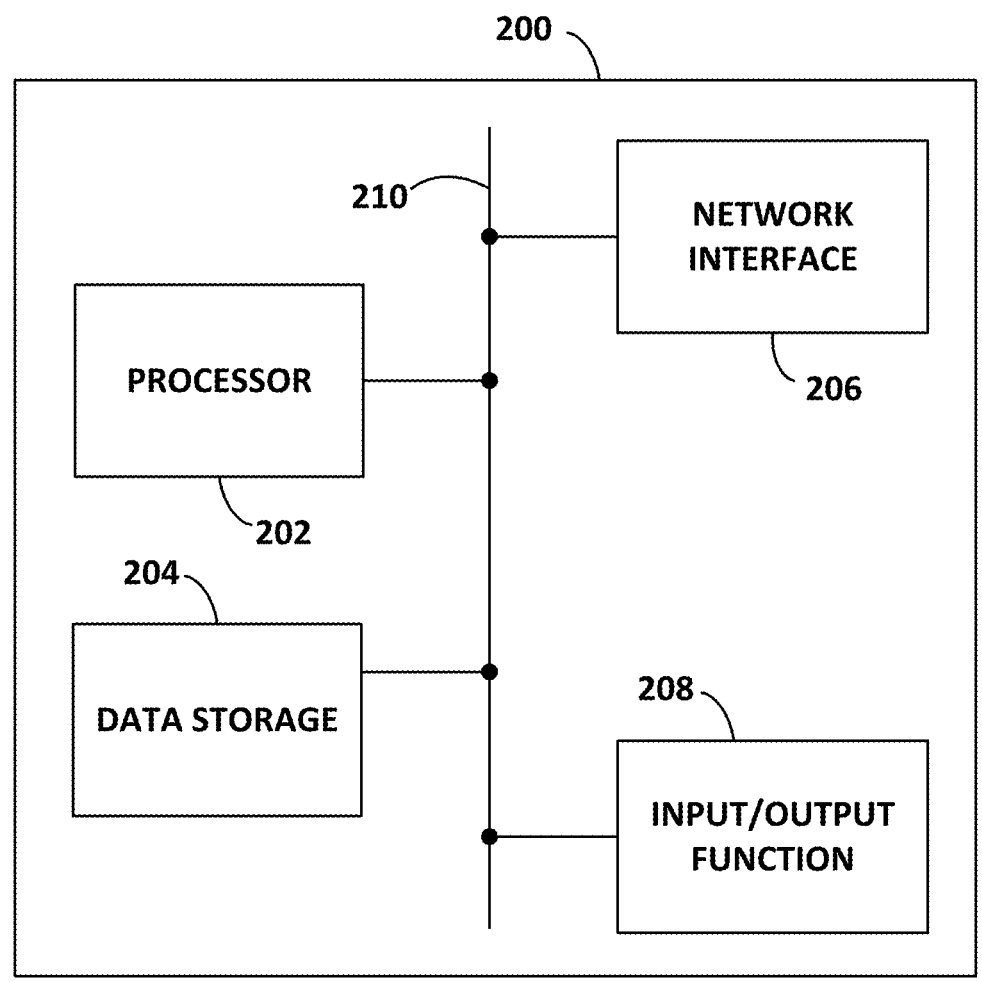
FIG. 2 illustrates a schematic drawing of a computing device, according to an example embodiment.

FIG. 2 is a simplified block diagram exemplifying a computing device 200, illustrating some of the functional components that could be included in a computing device arranged to operate in accordance with the embodiments herein. Example computing device 200 could be a client device, a server device, or some other type of computational platform. For purposes of simplicity, this specification may equate computing device 200 to a server from time to time. Nonetheless, the description of computing device 200 could apply to any component used for the purposes described herein.

In this example, computing device 200 includes a processor 202, a data storage 204, a network interface 206, and an input/output function 208, all of which may be coupled by a system bus 210 or a similar mechanism. Processor 202 can include one or more CPUs, such as one or more general purpose processors and/or one or more dedicated processors (e.g., application specific integrated circuits (ASICs), digital signal processors (DSPs), network processors, etc.).

Data storage 204, in turn, may comprise volatile and/or non-volatile data storage and can be integrated in whole or in part with processor 202. Data storage 204 can hold program instructions, executable by processor 202, and data that may be manipulated by these instructions to carry out the various methods, processes, or operations described herein. Alternatively, these methods, processes, or operations can be defined by hardware, firmware, and/or any combination of hardware, firmware and software.

By way of example, the data in data storage 204 may contain program instructions, perhaps stored on a non-transitory, computer-readable medium, executable by processor 202 to carry out any of the methods, processes, or operations disclosed in this specification or the accompanying drawings. Data storage 204 may also contain one or more playlists and/or audio files possibly referred to by playlists.

Network interface 206 may take the form of a wireline connection, such as an Ethernet, Token Ring, or T-carrier connection. Network interface 206 may also take the form of a wireless connection, such as IEEE 802.11 (Wifi), BLUETOOTH®, or a wide-area wireless connection. However, other forms of physical layer connections and other types of standard or proprietary communication protocols may be used over network interface 206. Furthermore, network interface 206 may comprise multiple physical interfaces.

Input/output function 208 may facilitate user interaction with example computing device 200. Input/output function 208 may comprise multiple types of input devices, such as a keyboard, a mouse, a touch screen, and so on. Similarly, input/output function 208 may comprise multiple types of output devices, such as a screen, monitor, printer, or one or more light emitting diodes (LEDs). Additionally or alternatively, example computing device 200 may support remote access from another device, via network interface 206 or via another interface (not shown), such as a universal serial bus (USB) or high-definition multimedia interface (HDMI) port.

In some embodiments, one or more computing devices may be deployed in a networked architecture. The exact physical location, connectivity, and configuration of the computing devices may be unknown and/or unimportant to client devices. Accordingly, the computing devices may be referred to as "cloud-based" devices that may be housed at various remote locations.

Figure 3:
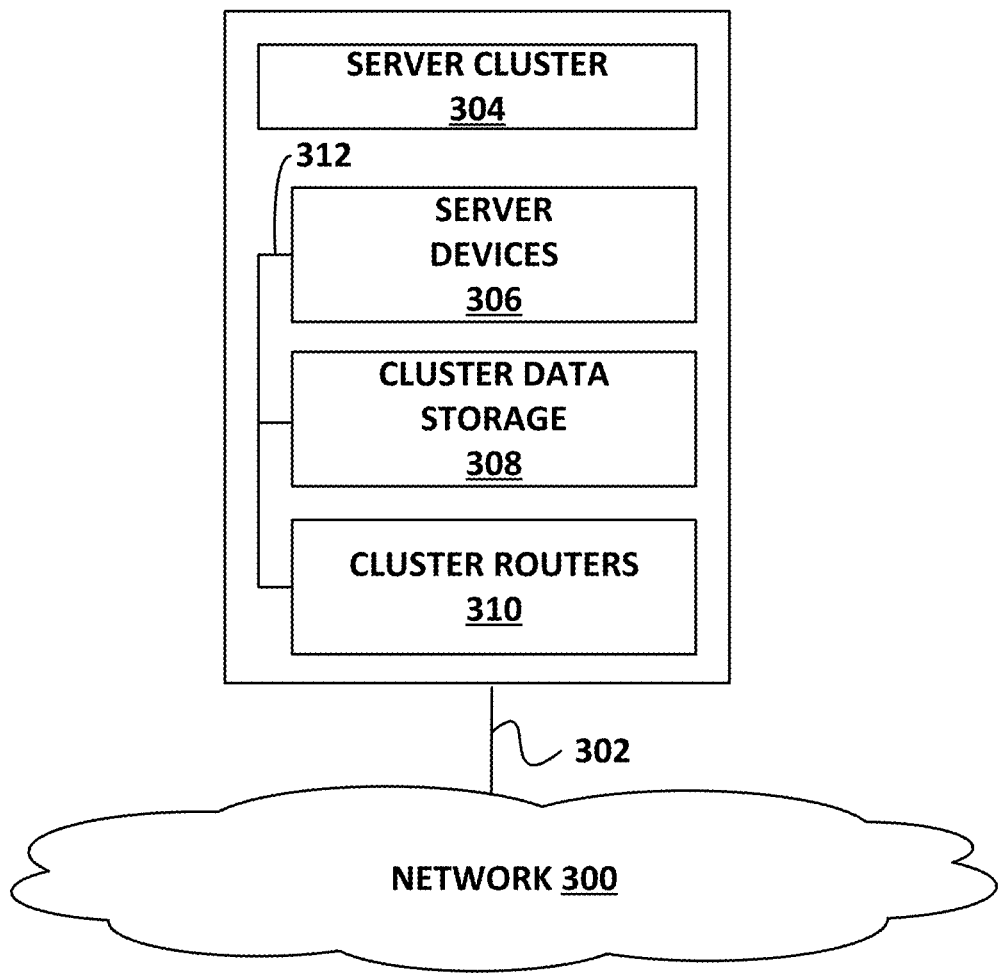
FIG. 3 illustrates a schematic drawing of a networked server cluster, according to an example embodiment.

FIG. 3 depicts a cloud-based server cluster 304 in accordance with an example embodiment. In FIG. 3, functions of a server device, such as server device 104 (as exemplified by computing device 200) may be distributed between server devices 306, cluster data storage 308, and cluster routers 310, all of which may be connected by local cluster network 312. The number of server devices, cluster data storages, and cluster routers in server cluster 304 may depend on the computing task(s) and/or applications assigned to server cluster 304.

For example, server devices 306 can be configured to perform various computing tasks of computing device 200. Thus, computing tasks can be distributed among one or more of server devices 306. To the extent that these computing tasks can be performed in parallel, such a distribution of tasks may reduce the total time to complete these tasks and return a result. For purposes of simplicity, both server cluster 304 and individual server devices 306 may be referred to as "a server device." This nomenclature should be understood to imply that one or more distinct server devices, data storage devices, and cluster routers may be involved in server device operations.

Cluster data storage 308 may be data storage arrays that include disk array controllers configured to manage read and write access to groups of disk drives (e.g., hard drives with rotating platters or solid state drives). The disk array controllers, alone or in conjunction with server devices 306, may also be configured to manage backup or redundant copies of the data stored in cluster data storage 308 to protect against disk drive failures or other types of failures that prevent one or more of server devices 306 from accessing units of cluster data storage 308. As an example, cluster data storage 308 may contain one or more playlists and/or audio files possibly referred to by playlists.

Cluster routers 310 may include networking equipment configured to provide internal and external communications for the server clusters. For example, cluster routers 310 may include one or more packet-switching and/or routing devices configured to provide (i) network communications between server devices 306 and cluster data storage 308 via cluster network 312, and/or (ii) network communications between the server cluster 304 and other devices via communication link 302 to network 300.

Additionally, the configuration of cluster routers 310 can be based at least in part on the data communication requirements of server devices 306 and cluster data storage 308, the latency and throughput of the local cluster networks 312, the latency, throughput, and cost of communication link 302, and/or other factors that may contribute to the cost, speed, fault-tolerance, resiliency, efficiency and/or other design goals of the system architecture.

As a possible example, cluster data storage 308 may include any form of database, such as a structured query language (SQL) database. Various types of data structures may store the information in such a database, including but not limited to tables, arrays, lists, trees, and tuples. Furthermore, any databases in cluster data storage 308 may be monolithic or distributed across multiple physical devices.

Server devices 306 may be configured to transmit data to and receive data from cluster data storage 308. This transmission and retrieval may take the form of SQL queries or other types of database queries, and the output of such queries, respectively. Additional text, images, video, and/or audio may be included as well. Furthermore, server devices 306 may organize the received data into web page representations. Such a representation may take the form of a markup language, such as the hypertext markup language (HTML), the extensible markup language (XML), or some other standardized or proprietary format. Moreover, server devices 306 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

3. Example Playlist and Streaming Environment

Figure 4:
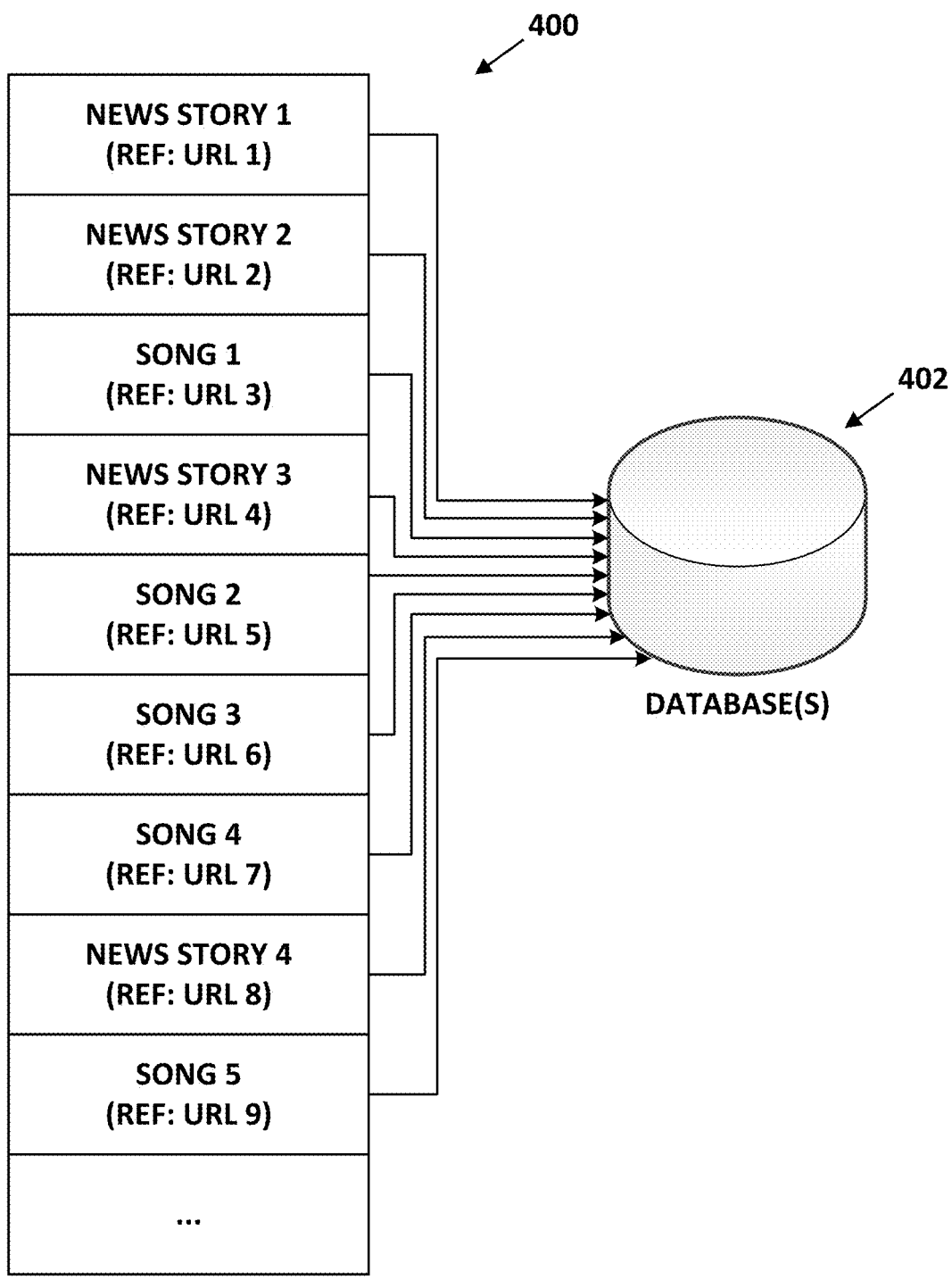
FIG. 4 depicts a playlist, according to an example embodiment.

FIG. 4 depicts an example playlist 400, which contains a sequence of two or more references to audio files. Playlist 400 may take the form of a computer file, such as a plain text file, an eXtensible Markup Language (XML) file, a HyperText Markup Language (HTML) file, a binary file, or some other file format. Playlists may take other forms as well, and may contain other types of content.

In some cases, playlist 400 may be generated by a server device, such as server device 104, for a specific client device, such as client device 102. In doing so, server device 104 may take into account information in a profile of client device 102 that is stored at or accessible to server device 104. For instance, this profile may include representations of preferences for a user of client device 102, such as preferred types of news stories, preferred styles of music, preferred bit rates and/or audio qualities of streamed audio files, and so on. In other cases, playlist 400 may be generated for a group of one or more client devices, possibly based on information in profiles of at least some of these devices.

Furthermore, as described in more detail below, server device 104 may generate playlist 400 so that the audio files referenced therein are thematically consistent, in terms of content and/or mood. Alternatively, server device 104 may generate playlist 400 so that the audio files referenced therein are at least not thematically inconsistent.

Each entry in playlist 400 may include an identifier of an audio file and/or a reference to the audio file. Audio files referred to in playlist 400 may be stored in database(s) 402. Thus, for example, the referenced news story 1 in playlist 400 contains a URL that points to the location of the audio file for news story 1, while the referenced song 1 in playlist 400 contains a URL that points to the location of the audio file for song 1, and so on. Nonetheless, playlists may take other forms, including generic sequences of files or references to files.

In general, database(s) 402 may contains hundreds, thousands, tens of thousands, or even more audio files. Thus, database(s) 402 may represent one or more physical devices that store these files. Such physical devices may be located in the same physical location, or may be distributed over a communication network (e.g., the Internet). In some cases, the audio files may be obtained via a third-party file download or streaming service.

Playlist 400 contains references to four news stories that are roughly interleaved with references to five pieces of music. A playlist may contain more or fewer entries, however. Additionally, the patterns of news stories and pieces of music may vary. In some cases, a playlist may predominately contain references to news stories with few references to music, and in other cases a playlist may predominately contain references to music with few references to news stories.

The mix of news stories and music referenced in playlist 400 may represent a "morning drive time" style of content, in which spoken material is interspersed with music. Thus, the "news stories" referred to in playlist 400 may include information regarding current events, weather, traffic, humorous pieces, banter, advertisements, and so on. Other arrangements of playlist content are possible.

In some embodiments, music and/or stories may be repeated to some extent. However, it is generally less desirable to repeat stories than it is to repeat music. On the other hand, repetition of stories containing advertisements may be desirable.

Figure 5A:
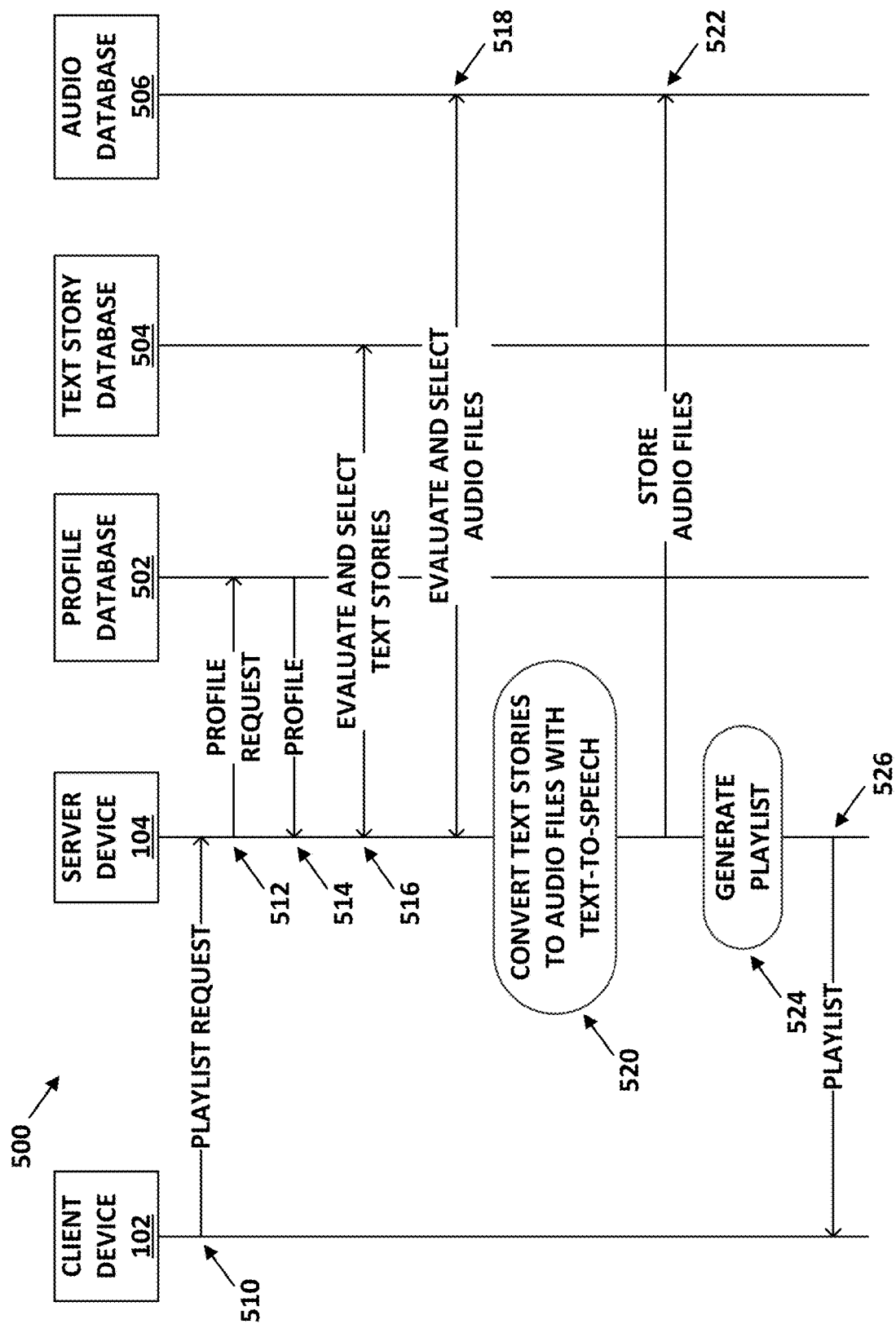
FIG. 5A is a message flow diagram depicting generation of a playlist, according to an example embodiment.

FIG. 5A is a message flow diagram 500 depicting example generation and distribution of a playlist. Flow chart 500 includes client device 102, server device 104, profile database 502, text story database 504, and audio database 506. In some embodiments, one or more of server device 104, profile database 502, text story database 504, and audio database 506 may be combined into fewer components or divided into more components. As just two possible examples, server device 104 may contain the functionality of profile database 502, text story database 504, and audio database 506, or each of profile database 502, text story database 504, and audio database 506 may be distributed over multiple physical computing devices. Other arrangements are possible.

Client device 102 may include an audio player application that can request playlists, load playlists, parse playlists, and/or request streams of audio files referenced in playlists. In some embodiments, the audio player application may be triggered to begin requesting and streaming the audio files by reception of the playlist.

At step 510, client device 102 may transmit a playlist request to server device 104. This request might not explicitly seek a particular playlist, but may instead request streaming of a personalized radio station for a user of client device 104. At step 512, server device 104 may transmit, to profile database 502, a profile request for the profile of client device 104. At step 514, profile database 502 may transmit a representation of this profile to server device 104.

The profile might include information regarding the user of client device 104 and his or her preferences with respect to radio programming. For instance, the profile might include demographic information about the user, information regarding the user's news interests, e-commerce transactions, the user's favorite music styles, favorite sports teams, and so on. Based at least partially on the information in the profile, server device 104 may select stories and music for the playlist.

Therefore, at step 516, server device 104 may evaluate and select text stories from text story database 504. Similarly, at step 518, server device 104 may evaluate and select audio files from audio database 506. Text story database 504 may include text files containing news stories, for example. Audio database 506 may include audio files of news stories and/or music. In some embodiments not shown, audio files containing news stories might be stored in one physical or logical database, while audio files containing music might be stored in a different physical or logical database.

In the case that one or more text files containing news stories are selected for inclusion in the playlist, at step 520, server device 104 (or another device) may convert these text files to audio files by using text-to-speech (TTS) technology. Such TTS technology may automatically transform words and/or syllables in a text file to synthetic utterances. At step 522, audio files of any converted news stories may be stored in audio database 506.

At step 524, server device 104 may generate the playlist. As was discussed in the context of playlist 400, the generated playlist may include a sequence of references to audio files stored in audio database 506. Then, at step 526, the playlist may be transmitted to client device 102.

Figure 5B:
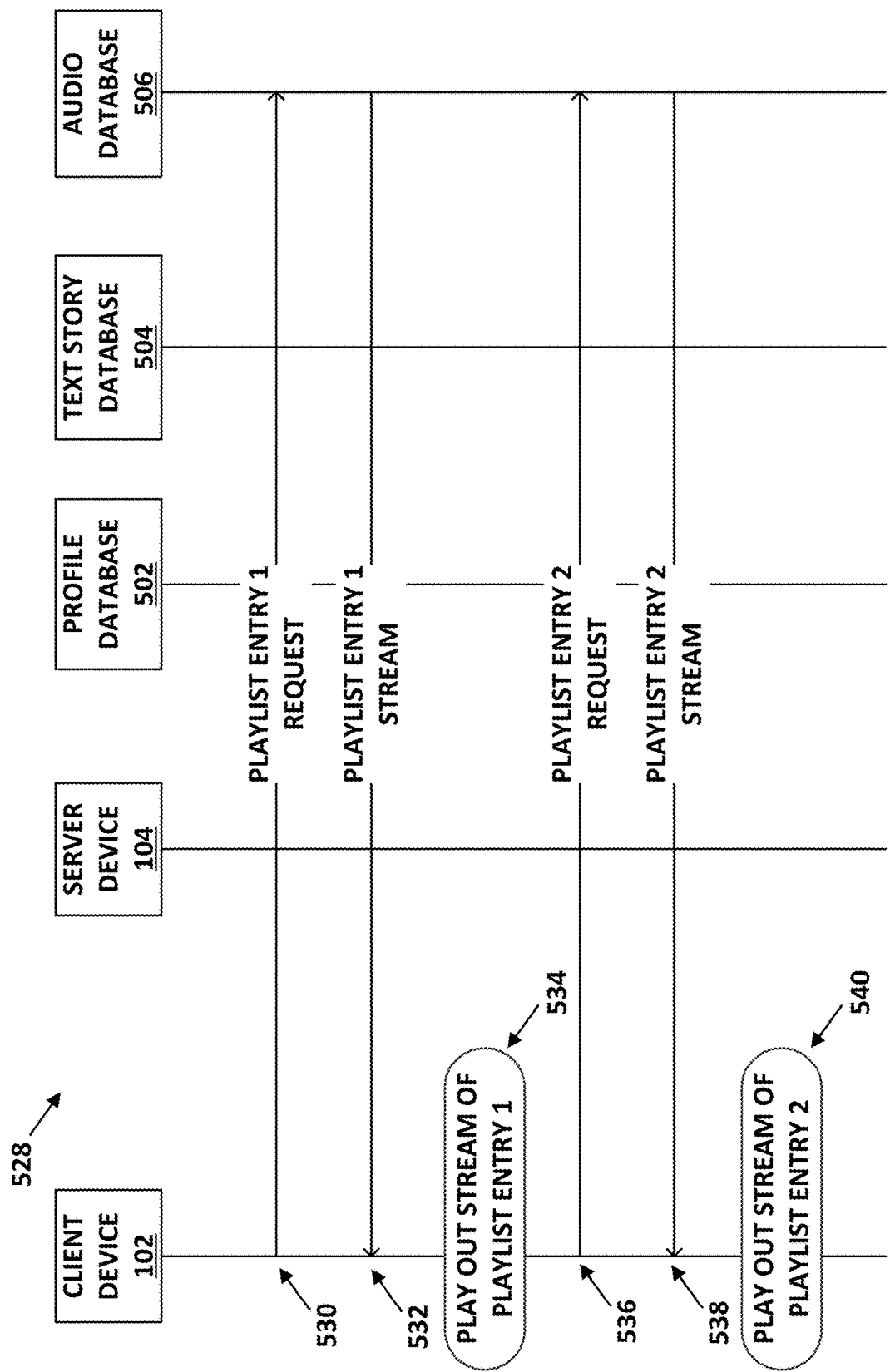
FIG. 5B is message flow diagram depicting playout of audio files referenced by a playlist, according to an example embodiment.

FIG. 5B is a message flow diagram 528 depicting example playout of audio files referenced in the playlist. Continuing from where FIG. 5A left off, at step 530, client device 102 may transmit, to audio database 506, a request for the first entry of the playlist. For instance, client device 102 may parse the playlist, determine the URL of the first entry, and request the content at that URL from audio database 506. In response, at step 532, audio database 506 may transmit, to client device 102, a stream of the audio file associated with this entry. Then, at step 534, client device 102 may play out the stream.

Notably, client device 102 may receive and buffer a portion of the stream (e.g., 5-10 seconds) before beginning playout of the stream. In this way, if there is jitter in the delivery of subsequent portions of the stream to client device 102, this jitter may be hidden from the user by the buffering of the stream. Client device 102 may seek to maintain this buffer through playout of all audio files.

At step 536, client device 102 may transmit, to audio database 506, a request for the second entry of the playlist. Client device 102 may transmit this request while still playing out a portion of the audio file associated with the first entry. In this manner, client device 102 may be able to transition smoothly from playout of the audio file associated with the first entry to playout of the audio file associated with the second entry. For instance, the audio player application may fade out the end of the audio file associated with the first entry while fading in the beginning of the audio file associated with the second entry.

Regardless, at step 538, audio database 506 may transmit, to client device 102, a stream of the audio file associated with the second entry. Then, at step 540, client device 102 may play out the stream.

FIGS. 5A and 5B are just example embodiments of playlist generation and audio file streaming. Other embodiments may be used to achieve the same or similar outcomes.

4. Generating Playlists with Related Music and Stories

One possible disadvantage of computer-generated playlists is that the stories and music selected for inclusion in a given playlist might be unrelated. The generation of these playlists, however, provides an opportunity to thematically associate the entries therein. For example, attributes or characteristics of each entry in the playlist may be used as a basis for selecting other entries in the playlist, or to order previously-selected entries.

For instance, the text within a text file containing a story may be used to select other entries (stories or music) in the playlist. Further, an audio file containing music may include or be associated with one or more attributes. These attributes may exist as metadata that can be included in the audio file or in another file paired with the audio file. Such attributes may include various descriptors of the audio file and/or the music contained therein, such as the name of the artist(s) who wrote and/or performed the music, the title of the music (e.g., a song title), lyrics to the music, the length of the music, the publisher of the music (e.g., the record label), where the music was recorded, and so on. Any of these attributes may be used to select other entries (stories or music) in the playlist.

In some embodiments, playlists may have a pre-defined theme (e.g., a "classic rock" theme for a playlist focused on music, an "artist" theme for a playlist involving music and/or interviews with a particular artist, or a "soccer" theme for stories and/or music related to a particular soccer event or team). When a playlist is associated with such a theme, selections of the entries therein may be based on the theme as well as other entries in the playlist.

When an audio file is selected for a particular reason (e.g., it is determined to be related to the content of a previous audio file), this reason may be displayed to the user of the client device that plays out the audio file. Further, the user may be given the ability (e.g., via a user interface) to express preferences for certain types of relationships between audio files. For instance, the user might indicate that the relationship used (i) was acceptable, (ii) should not be used again, or (iii) should be replaced by a different relationship.

A. Selecting a Story Based on Music

An audio file containing music may be selected for inclusion in the playlist based on information in the user profile. For instance, the user profile may indicate that the user for whom the playlist is being generated previously expressed interest in the style of the music or the artist who performs the music.

Any of the attributes of the audio file may be used to select a story that precedes or follows the audio file in the playlist. As an example, the artist name may be used to find a news story regarding the artist, and a reference to this news story may be placed in the playlist at a position before or after the reference to the audio file containing the music. If the user is interested in the artist, the selected story is also likely to be of interest to the user. For instance, the selected story may include tour dates for the artist, or news of an upcoming album release from the artist.

In some cases, the story may be selected also based on information in the user's profile, such as the user's location and/or purchasing history. For instance, the story including tour dates may be selected because one or more of those tour dates is geographically nearby the location of the user (e.g., within a 50 mile threshold distance from the user's home). Alternatively or additionally, the news of the upcoming album release may be selected because the user's purchasing history includes the purchase of another album or song from the artist.

Other examples of selecting a story based on attributes associated with an audio file containing music are possible. For instance, the title or lyrics may be used as a basis for selecting a story. Particularly, the server device may identify keywords or keyphrases appearing in the title or lyrics, and may then use these keywords or keyphrases as input to a search engine. The search engine may return one or more stories related to the keywords or keyphrases. As an example, if the title or lyrics contain the words "car," "truck," "drive," or "driving," the search engine may return references to one or more stories about automobiles, driving, roads, or traffic conditions. Further, the search engine may also return references to one or more stories containing advertisements for automobile sales.

In cases where the selected story exists in a text file, the server device may use TTS technology to convert the text file to an audio file containing the story, store this audio file in a database, and include a reference to the stored audio file in the playlist.

Figure 6:
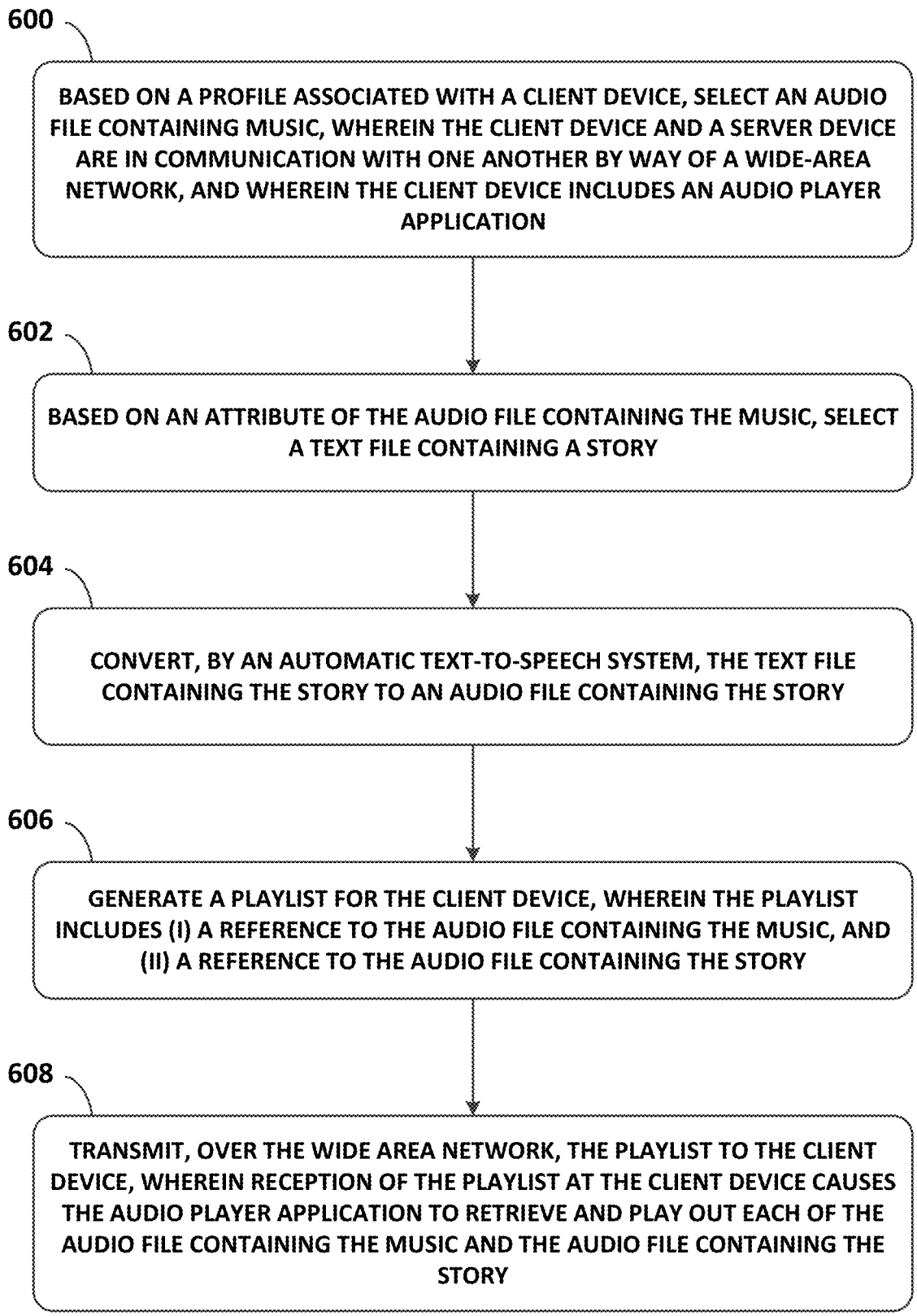
FIG. 6 is a flow chart for playlist generation and distribution, according to an example embodiment.

FIG. 6 is a flow chart illustrating an example embodiment. The process illustrated by FIG. 6 may be carried out by a server device, such as computing device 200, and/or a cluster of computing devices, such as server cluster 304. However, the process can be carried out by other types of devices or device subsystems.

Block 600 may involve, possibly based on a profile associated with a client device, selecting an audio file containing music. The client device and the server device may be in communication with one another by way of a wide-area network, and the client device may include an audio player application.

Block 602 may involve, possibly based on an attribute of the audio file containing the music, selecting a text file containing a story. Block 604 may involve converting, by an automatic text-to-speech system, the text file containing the story to an audio file containing the story. In some cases, blocks 602 and 604 may be replaced by directly selecting an audio file containing the story. This may occur if the audio file is associated with one or more attributes that describe its content.

Block 606 may involve generating a playlist for the client device, wherein the playlist includes (i) a reference to the audio file containing the music, and (ii) a reference to the audio file containing the story. Block 608 may involve transmitting, over the wide area network, the playlist to the client device. Reception of the playlist at the client device may cause the audio player application to retrieve and play out each of the audio file containing the music and the audio file containing the story. The audio player application may retrieve each of the audio file containing the music and the audio file containing the story from the server device.

In some cases, the text or audio file containing the story may also be selected based on the text or audio file containing the story being available from a third-party media server affiliated with the server device. In other words, the text or audio file containing the story might be selected from a media server that is not operated or owned by the entity that operates or owns the server device that generates the playlist.

The attribute may be one of an artist name associated with the music, a song title associated with the music, and/or a song lyric associated with the music. But other attributes are possible. The text or audio file containing the story may be selected based on the attribute being in or associated with the text or audio file containing the story. Alternatively or additionally, the attribute may be associated with a particular geographical region, and the text or audio file containing the story may be selected based on the text or audio file containing the story including text related to the particular geographical region or being associated with the particular geographical region.

In other embodiments, the profile associated with the client device may contain an indication of a location of the client device, and the audio file containing the music may be selected so that the attribute is related to the location of the client device. Or, the audio file containing the music may be selected based on an artist associated with the music performing within a pre-defined distance of the location of the client device within an upcoming time period (e.g., within the next several days or weeks).

In some embodiments, the reference to the audio file containing the music may be ordered in the playlist before the reference to the audio file containing the story. Thus, the audio player application may retrieve and play out at least some of the audio file containing the music before retrieving and playing out the audio file containing the story. Alternatively, the reference to the audio file containing the music may be ordered in the playlist after the reference to the audio file containing the story. In this case, the audio player application may retrieve and play out at least some of the audio file containing the music after retrieving and playing out the audio file containing the story.

In some embodiments, the profile associated with the client device may contain a preferred language, and the audio file containing the music may be selected so that at least some singing therein is in the preferred language. The attribute may indicate that at least some of a singing portion of the music is in the preferred language, and the text or audio file containing the story may be selected based on at least part of the story being in the preferred language.

B. Selecting Music Based on a Story

Instead of or in addition to selecting a story based on attributes associated with an audio file, an audio file may be selected based on the content of a story. This may involve selecting a text file containing a story based on the profile of the user, then selecting an audio file containing music based on the content of the text file. For instance, the text file may be selected based on the user's demographics, interests, location, purchasing history, and/or other factors.

The server device may identify keywords or keyphrases appearing in the text file, and may then use these keywords or keyphrases as input to a search engine. The search engine may return references to one or more audio files containing music that are related to the keywords or keyphrases. For instance, the search engine may search for the keywords or keyphrases in attributes associated with the audio files. As an example, if the text files contains the words "car," "truck," or "drive," or "driving," the search engine may return references to one or more audio files with artist names, song titles, or lyrics about automobiles and driving. In some embodiments, a semantic analysis of the text file may take place to determine meaning(s) or theme(s) of the words therein. A semantic analysis may involve associating syntactic structures, such as phrases, clauses, sentences, paragraphs, and so on, to their language-independent meanings. In this way, the words in a text or audio file may be considered in context of other words therein. The outcome of this analysis may be used to select one or more moods of the text.

Further, the server device may use TTS technology to convert the text file to an audio file containing the story, store this audio file in a database, and include a reference to the stored audio file in the playlist.

Figure 7:
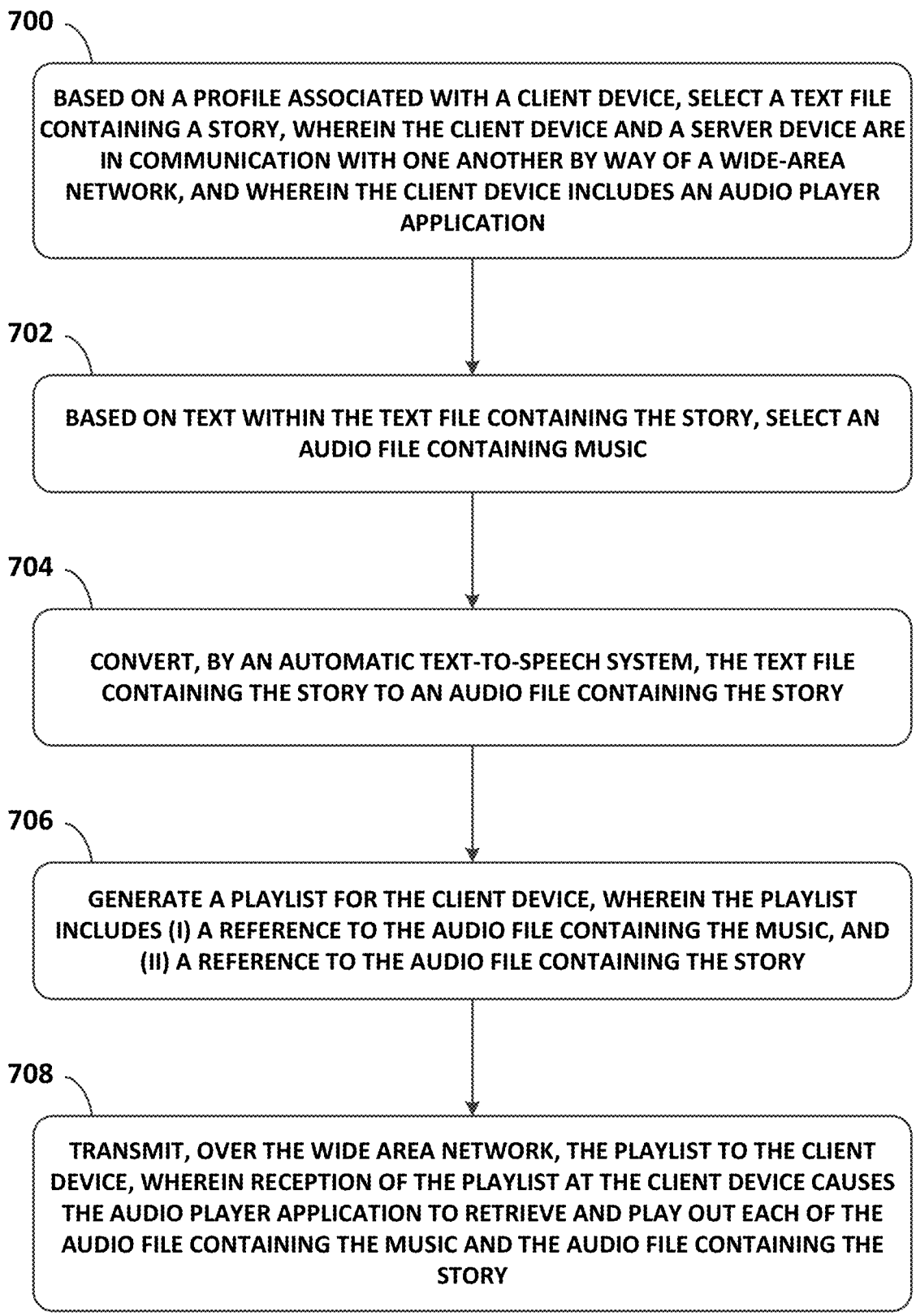
FIG. 7 is a flow chart for playlist generation and distribution, according to an example embodiment.

FIG. 7 is a flow chart illustrating an example embodiment. Like FIG. 6, the process illustrated by FIG. 7 may be carried out by a server device, such as computing device 200, and/or a cluster of computing devices, such as server cluster 304. However, the process can be carried out by other types of devices or device subsystems.

Block 700 may involve, possibly based on a profile associated with a client device, selecting a text file containing a story. The client device and the server device may be in communication with one another by way of a wide-area network, and the client device may include an audio player application.

Block 702 may involve, possibly based on text within the text file containing the story, selecting an audio file containing music. The audio file containing the music may be selected based on the text matching one of an artist name, a song title, or a song lyric associated with the music. Block 704 may involve converting, by an automatic text-to-speech system, the text file containing the story to an audio file containing the story.

In some cases, at least parts of blocks 700, 702, and 704 may be replaced by directly selecting an audio file containing the story. This may occur if the audio file is associated with one or more attributes that describe its content. In these cases, a separate conversion block might not be necessary.

Block 706 may involve generating a playlist for the client device. The playlist may include (i) a reference to the audio file containing the music, and (ii) a reference to the audio file containing the story. Block 708 may involve transmitting, over the wide area network, the playlist to the client device. Reception of the playlist at the client device may cause the audio player application to retrieve and play out each of the audio file containing the music and the audio file containing the story.

The embodiments of FIGS. 6 and 7 may be simplified by the removal of any one or more of the features shown therein. Further, these embodiments may be combined with one another, as well as features, aspects, and/or implementations of any of the previous figures or otherwise described herein.

5. Generating Playlists with Related Music and Story Mood

Another possible disadvantage of computer-generated playlists is that the stories and music selected for inclusion in a given playlist might have different moods. The transition between some moods might be jarring to the listener. For instance, if a news story in the playlist is about the benefits of quiet mediation, but the previous or next audio file referenced in the playlist contains a loud, driving piece of music, the sequencing of these entries might seem inappropriate.

Even worse, computer-generated playlists might place a news story about a tragedy before or after a piece of music with lyrics that are insensitive in the context of the tragedy. As an example, if a news story is a report about a shooting, or the trial of the perpetrators of the shooting, music following this news story with lyrics that glorify or joke about guns, death, or lawlessness would seem to mock the tragedy. Such an arrangement of entries in a playlist might be offensive to a listener.

The computerized generation of playlists, however, provides an opportunity to select entries in the playlist such that the moods of sequentially ordered music and stories are related. In some cases, this means that the mood of an entry in the playlist is based on the moods of one or more previous entries in the playlist. For instance, the mood of entry i in the playlist may be similar or the same as that of entry i−1 in the playlist, or the mood of entry i may be opposed to that of entry i−1. In doing so, the textual content of news stories, as well as the content of music, may be taken into account.

The mood of a story may be determined by the presence or absence of certain keywords and/or keyphrases. As noted above, a semantic analysis of the text file may take place to determine meaning(s) or theme(s) of the words therein. The outcome of this analysis may be used to select one or more moods of the text. For audio stories, the vocal characteristics of the speaker, such as prosodic information (e.g., intonation of the voice, emphasis on certain syllables or words), may be used instead or as well.

In some cases, audio files containing stories may be converted, using speech-to-text (speech recognition) technology into text files containing the stories. Then, these text files can be analyzed for keywords and keyphrases, and/or semantic information, associated with one or more moods. In some cases, a human may manually determine one or more moods of a story. The audio files containing the stories may then be associated with the identified moods. For instance, the moods might be included in the audio files as metadata, or in separate files associated with the respective audio files.

The mood of a piece of music may be determined by the presence or absence of certain keyword and/or keyphrases in the artist name, song title, and/or lyrics of the music, as well as the tempo, dynamic range, and/or volume of the music. As noted above, an audio file containing music may be associated with metadata that contains textual representations of these characteristics.

Not unlike textual representations of stories, this metadata can be analyzed for keywords and keyphrases associated with one or more moods. In some cases, a human may manually determine one or more moods of a piece of music. The audio files containing the music may then be associated with the identified moods. For instance, the moods might be included in the audio files as metadata, or in separate files associated with the respective audio files.

Based on the identified mood of a story, an appropriate audio file containing music may be selected. Alternatively or additionally, based on the identified mood of a piece of music, an appropriate audio file containing a story may be selected. Relationships between various moods that may facilitate these processes are illustrated in FIG. 8.

Table 800 lists a plurality of moods: happiness, sadness, humor, tragedy, anger, frustration, anxiety, loneliness, confusion, excitement, hope, and relaxation. For each of these moods, an entry provides an indication a particular mood's relationship with the other moods. Where an entry contains a check mark, the two moods match one another. Where an entry contains an x, the two moods are opposed to one another. Where the entry is blank, the two moods neither match nor are opposed to one another.

For instance, happiness is a match for itself, as well as humor. Happiness is also opposed to sadness, tragedy, anger, frustration, and loneliness. Thus, if the goal is to match the mood of a story to that of a piece of music associated with happiness, only stories associated with moods of happiness or humor would be candidates for selection. On the other hand, if the goal is to choose a story with a mood that does not oppose that of the piece of music associated with happiness, only stories associated with moods of sadness, tragedy, anger, frustration, and loneliness would be excluded from selection. Further, if the goal is to choose a story with a mood that is opposed to that of the piece of music associated with happiness, only stories associated with moods of sadness, tragedy, anger, frustration, and loneliness would be selected.

The relationships indicated by table 800 are presented for purpose of example. Different relationships between moods may be used, and thus table 800 could be filled out differently. Further, more or fewer moods may be used in such a table.

In some situations, music with certain moods or content may be purposely omitted from playlists. Thus, audio files containing music that are associated with characteristics that embody a particular mood might be excluded from playlists. This may be done, for instance, in response to current events or due to the current date. For example, music associated with sadness or anger might not be placed in playlists that are generated on a festive holiday.

Further, based on a profile of a client device, music associated with certain moods or associated with certain keywords, keyphrases, or semantics might not be included in playlists generated for that client device. This may be done to avoid offending a user with known sensitivities.

As noted above, playlists may have a pre-defined theme (e.g., a "classic rock" theme for a playlist focused on music, an "artist" theme for a playlist involving music and/or interviews with a particular artist, or a "soccer" theme for stories and/or music related to a particular soccer event or team). When a playlist is associated with such a theme, selections of the entries therein may be based on the theme as well as the mood of other entries in the playlist.

When an audio file is selected for a particular reason (e.g., it is determined to be related to the content of a previous audio file), this reason may be displayed to the user of the client device that plays out the audio file. Further, the user may be given the ability (e.g., via a user interface) to express preferences for certain types of relationships between audio files. For instance, the user might indicate that the relationship used (i) was acceptable, (ii) should not be used again, or (iii) should be replaced by a different relationship.

A. Selecting Music Based on the Mood of a Story

Figure 9:
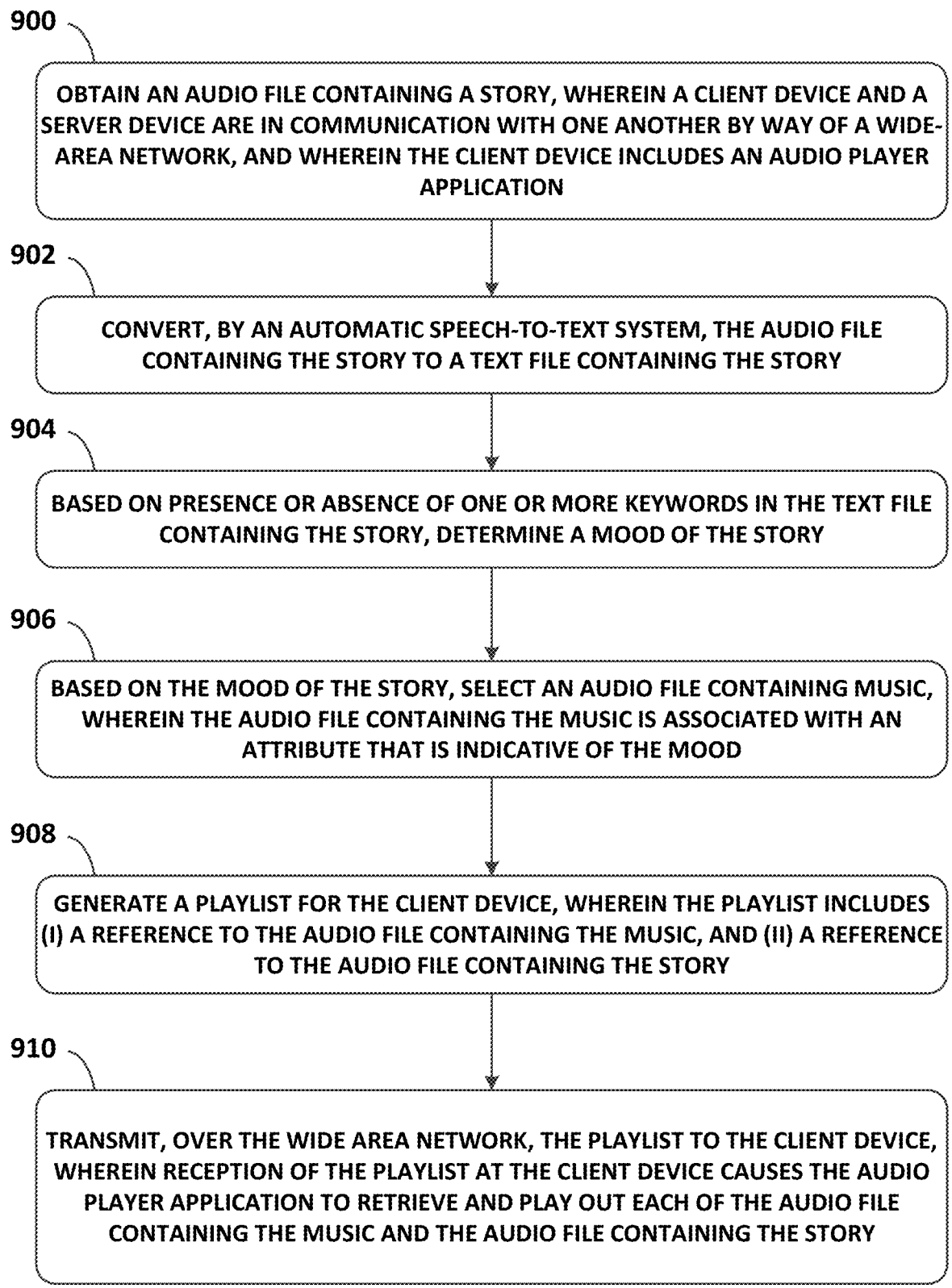
FIG. 9 is a flow chart for playlist generation and distribution, according to an example embodiment.

FIG. 9 is a flow chart illustrating an embodiment for selecting an audio file containing music based on the mood of a story. Like FIGS. 6 and 7, the process illustrated by FIG. 9 may be carried out by a server device, such as computing device 200, and/or a cluster of computing devices, such as server cluster 304. However, the process can be carried out by other types of devices or device subsystems.

Block 900 may involve obtaining an audio file containing a story. A client device and the server device may be in communication with one another by way of a wide-area network, and the client device may include an audio player application. Block 902 may involve converting, by an automatic speech-to-text system, the audio file containing the story to a text file containing the story.

Block 904 may involve, possibly based on presence or absence of one or more keywords in the text file containing the story, determining a mood of the story. This block may involve a semantic analysis and/or a prosodic analysis. The mood may be one of happiness, sadness, humor, tragedy, anger, frustration, anxiety, loneliness, confusion, excitement, hope, relaxation, or some other mood.

In some cases, the audio file containing a story may already be associated with a mood. In such situations, part or all of blocks 902 and 904 may be omitted. For instance, determining the mood of the story may be based on one or more story attributes associated with the audio file containing the story.

Block 906 may involve, possibly based on the mood of the story, selecting an audio file containing music. The audio file containing the music may be associated with one or more music attributes that is indicative of the mood. In some cases, the story attribute(s) may match the music attribute(s). Alternatively or additionally, selecting the audio file containing the music may be based on presence or absence of the one or more keywords in (i) an artist name associated with the music, (ii) a title associated with the music, or (iii) lyrics associated with the music.

Block 908 may involve generating a playlist for the client device. The playlist may include (i) a reference to the audio file containing the music, and (ii) a reference to the audio file containing the story. Generating the playlist to include (i) the reference to the audio file containing the music, and (ii) the reference to the audio file containing the story may be based on the mood, a date, and/or a time of day.

Block 910 may involve transmitting, over the wide area network, the playlist to the client device. Reception of the playlist at the client device may cause the audio player application to retrieve and play out each of the audio file containing the music and the audio file containing the story. The audio player application may retrieve each of the audio file containing the music and the audio file containing the story from the server device. Alternatively, at least one of the audio file containing the music or the audio file containing the story may be retrieved from a third-party media server affiliated with the server device.

In some embodiments, the reference to the audio file containing the music may be ordered in the playlist before the reference to the audio file containing the story, and the audio player application may retrieve and play out at least some of the audio file containing the music before retrieving and playing out the audio file containing the story. Alternatively, the reference to the audio file containing the music may be ordered in the playlist after the reference to the audio file containing the story, and the audio player application may retrieve and play out at least some of the audio file containing the music after retrieving and playing out the audio file containing the story.

The one or more music attributes being indicative of the mood may involve the music attribute(s) representing the mood. In some embodiments, the mood may be a first mood, and the music attribute(s) being indicative of the first mood may involve the music attribute(s) representing a second mood that is based on the first mood. The music attribute(s) being indicative of the mood may further involve the music attribute(s) indicating that a particular tempo, a particular beat pattern, or a particular chord progression is (i) associated with the mood, and (ii) present in the music.

B. Selecting a Story Based on the Mood of a Piece of Music

Figure 10:
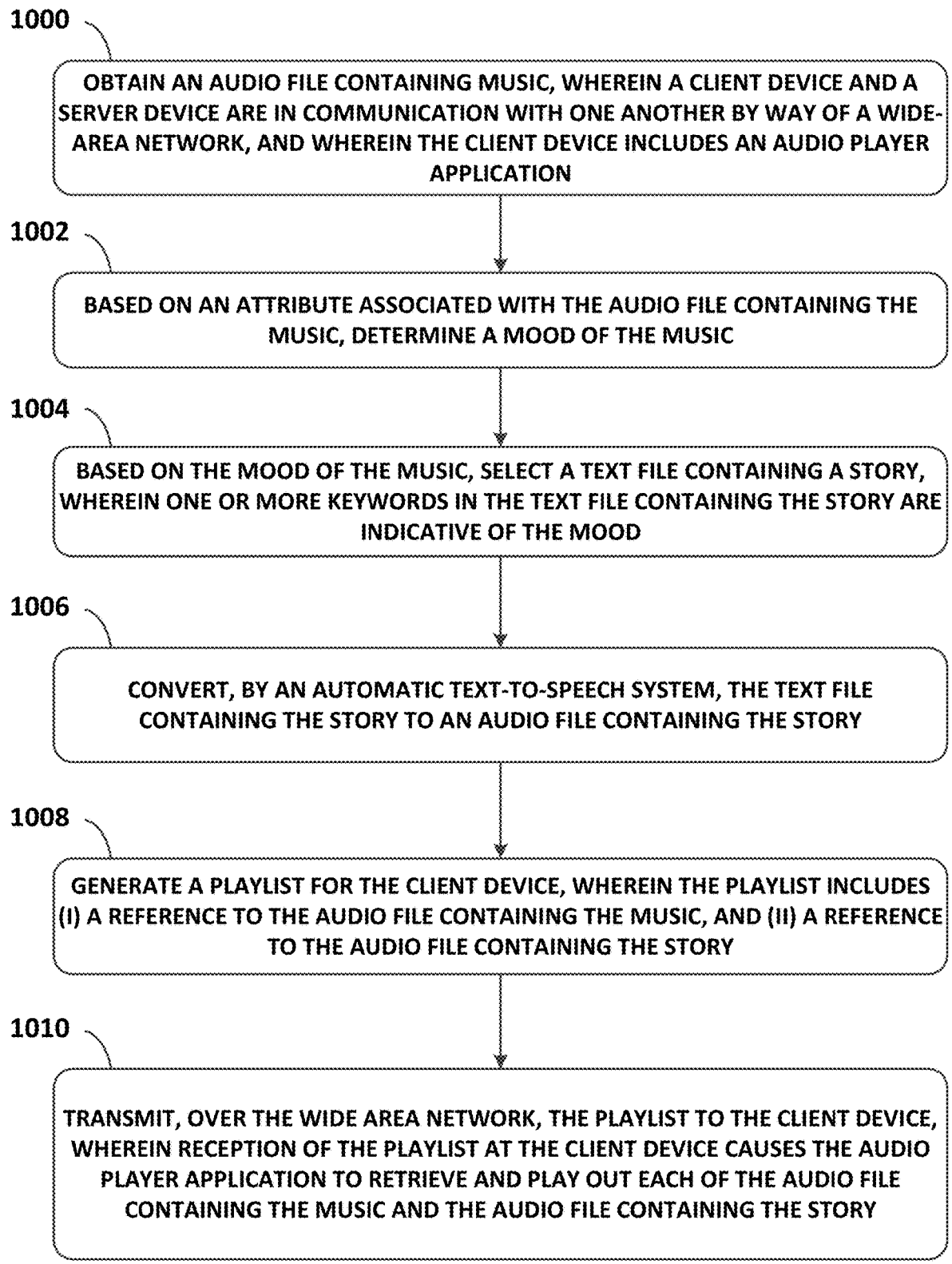
FIG. 10 is a flow chart for playlist generation and distribution, according to an example embodiment.

FIG. 10 is a flow chart illustrating an embodiment for selecting an audio file containing a story based on the mood of a piece of music. Like FIGS. 6, 7, and 9, the process illustrated by FIG. 10 may be carried out by a server device, such as computing device 200, and/or a cluster of computing devices, such as server cluster 304. However, the process can be carried out by other types of devices or device subsystems.

Block 1000 may involve obtaining an audio file containing music. A client device and the server device may be in communication with one another by way of a wide-area network, and the client device may include an audio player application.

Block 1002 may involve, possibly based on one or more music attributes associated with the audio file containing the music, determining a mood of the music. The music attribute(s) may be indicative of the mood. For instance, the music attribute(s) may indicate that a particular tempo, a particular beat pattern, or a particular chord progression is (i) associated with the mood, and (ii) present in the music.

Block 1004 may involve, possibly based on the mood of the music, selecting a text file containing a story. One or more keywords in the text file containing the story, or the semantics thereof, may be indicative of the mood. Block 1006 may involve converting, by an automatic text-to-speech system, the text file containing the story to an audio file containing the story. In some cases, at least part of blocks 1004 and 1006 may be replaced by directly selecting an audio file containing the story. This may occur where the audio file containing the story is associated with one or more story attributes that describe its content.

Block 1008 may involve generating a playlist for the client device. The playlist may include (i) a reference to the audio file containing the music, and (ii) a reference to the audio file containing the story.

Block 1010 may involve transmitting, over the wide area network, the playlist to the client device. Reception of the playlist at the client device may cause the audio player application to retrieve and play out each of the audio file containing the music and the audio file containing the story.

The embodiments of FIGS. 9 and 10 may be simplified by the removal of any one or more of the features shown therein. Further, these embodiments may be combined with one another, as well as features, aspects, and/or implementations of any of the previous figures or otherwise described herein.

6. Generating Playlists Based on Time Constraints

Media playout devices, such as radios and televisions, as well as media player applications on various types of computing devices, may support sleep timers. If a sleep timer function is activated during audio (or video) playout, the playout continues for a designated period of time, and then is abruptly terminated at the end of the duration defined by the sleep timer. A goal of such a function is to allow a user to drift off to sleep while the playout occurs, and to turn off the playout once the user is sleeping, thereby saving energy and providing for a quieter, more sleep-conducive environment.

However, the media that is played out between when the sleep timer function is activated and playout is terminated does not change due to activation of the sleep timer function—the media played out is the same as if the sleep timer function had not been activated. Thus, any media that is not conducive to sleep (e.g., loud music and/or music with a high dynamic range), may be played out when the user is trying to sleep. Also, the abrupt termination of the playout may be disturbing to the user, and may even wake up a sleeping user. With computer generation of playlists, these two disadvantages of the current technology can be overcome.

Nonetheless, the embodiments described herein can be used for purposes other than supporting an improved sleep timer function. These embodiments may be used, for example, whenever a user wishes to change an existing playlist, or to generate a playlist of a specific duration and/or of a specific mood. For instance, a positioning unit (e.g., global positioning system (GPS)) in an automobile or on a wireless communication device may be used at least in part to determine a time to reach a destination. The timers herein may be set based on such a time, and may also be updated as that time changes. Or, the timers herein may be based on a predetermined schedule, such as events occurring in an individual's or group's calendar application, or based on a train or bus schedule. Other possibilities exist.

Figure 11:
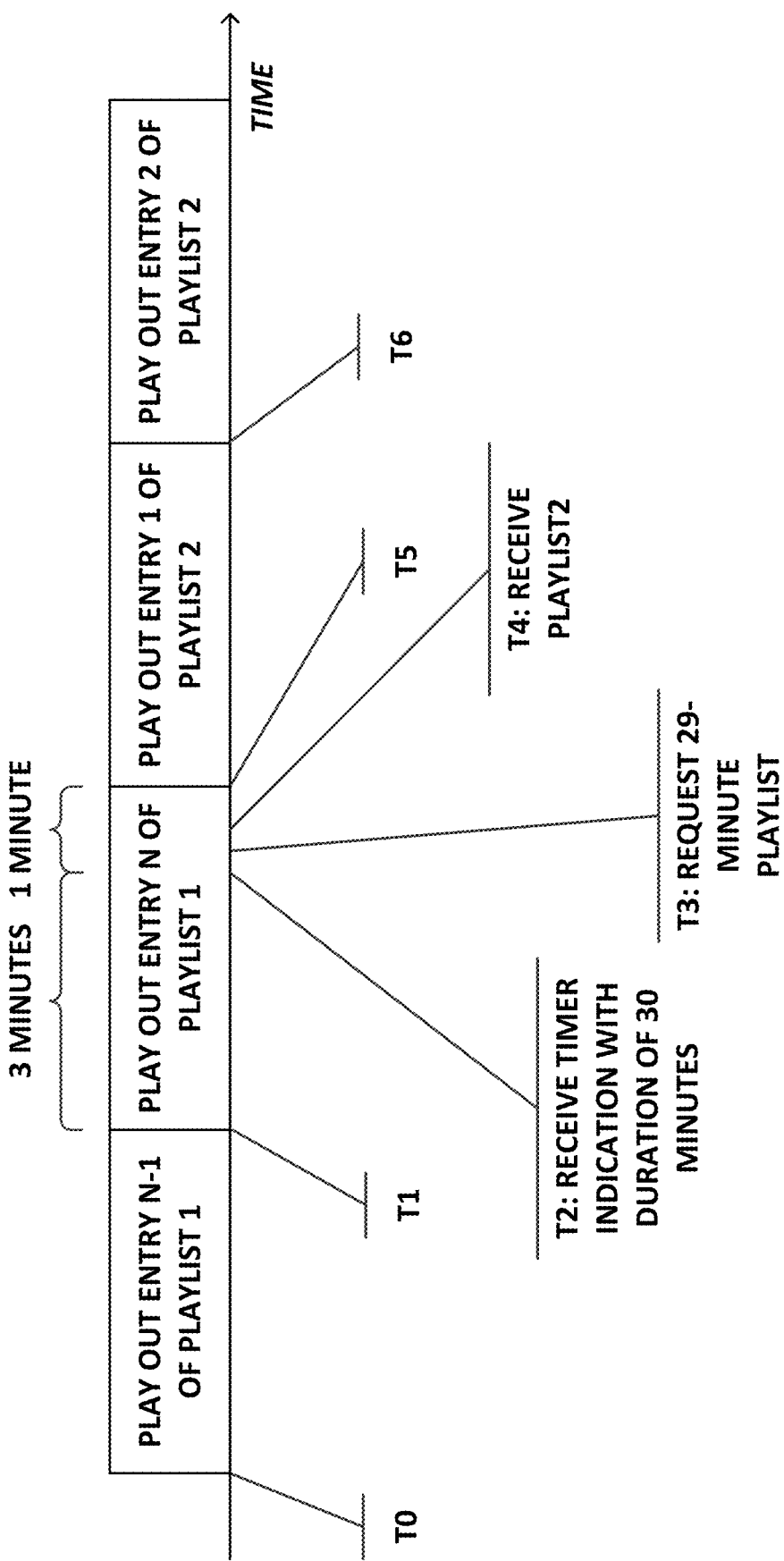
FIG. 11 is a timing diagram, according to an example embodiment.

FIG. 11 depicts a timing diagram for generating a new playlist in response to activation of a timer function. At time T0, a client device begins playout of entry n−1 of playlist 1. Playlist 1 may be a playlist that was generated for the client device, and may have been generated according to any of the embodiments herein. Not unlike the embodiment of FIG. 5B, the client device may, for each entry in playlist 1, (i) sequentially request and receive a stream of the entry, and (ii) play out the stream.

At time T1, the client device begins playout of entry n of playlist 1. This entry is approximately four minutes long. At time T2, about three minutes into the playout of entry n of playlist 1, the client device receives a timer function activation, indicating that the requested duration of the timer is 30 minutes. The timer may have been activated by a user of the client device, and the user may have selected the duration, or the duration may have been selected automatically based on a predetermined schedule or a trigger from another software unit.

In response to receiving the timer function activation, and with the understanding that there is approximately one minute remaining in the playout of entry n of playlist 1, at time T3 the client device may request a 29-minute playlist. This request may be transmitted to a server device, for instance the server device that provided playlist 1 to the client device.

In response to receiving such a request, the server device may generate playlist 2. The entries for this playlist may be selected so that the total duration of the playlist is approximately 29 minutes long. Further, if the timer is a sleep timer, these entries may be selected so that they are conducive to sleep. For example, music with slow tempos, narrow dynamic ranges, and/or lower volumes may be selected. Additionally, entries in the playlist may be arranged so that any music or stories therein grow gradually quieter over the duration of the playlist. Thus, playlist 2 may be organized to lull a listener to sleep.

At time T4, the client device may receive playlist 2. At time T5, as the playout of entry n of playlist 1 ends, the client device may begin playing out entry one of playlist 2. Thus, the client device may switch from playing out the entries of playlist 1 to playing out the entries of playlist 2. At time T6, the client device may continue playout of the entries of playlist 2 by beginning playout of entry 2 of playlist 2.

Figure 12:
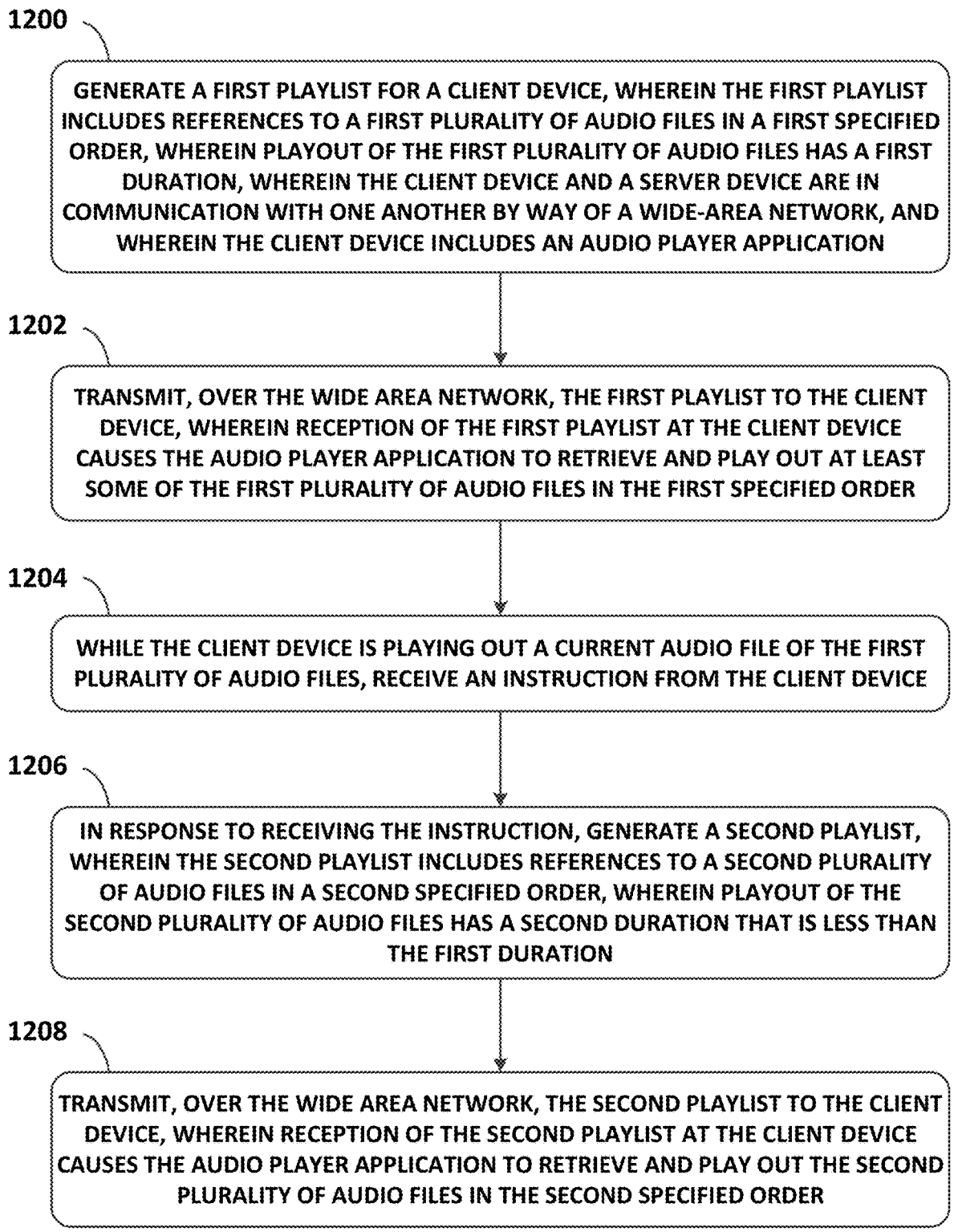
FIG. 12 is a flow chart for playlist generation and distribution, according to an example embodiment.

FIG. 12 is a flow chart illustrating an embodiment for switching from playout of one playlist to playout of another playlist. Like FIGS. 6, 7, 9, and 10, the process illustrated by FIG. 12 may be carried out by a server device, such as computing device 200, and/or a cluster of computing devices, such as server cluster 304. However, the process can be carried out by other types of devices or device subsystems.

Block 1200 may involve generating a first playlist for a client device. The first playlist may include references to a first plurality of audio files in a first specified order. Playout of the first plurality of audio files may have a first duration. The client device and the server device may be in communication with one another by way of a wide-area network, and the client device may include an audio player application.

Block 1202 may involve transmitting, over the wide area network, the first playlist to the client device. Reception of the first playlist at the client device may cause the audio player application to retrieve and play out at least some of the first plurality of audio files in the first specified order.

Block 1204 may involve, while the client device is playing out a current audio file of the first plurality of audio files, receiving an instruction from the client device. Block 1206 may involve, possibly in response to receiving the instruction, generating a second playlist. The second playlist may include references to a second plurality of audio files in a second specified order. Playout of the second plurality of audio files may have a second duration that is less than the first duration.

Further, the second plurality of audio files might not include any audio files of the first plurality of audio files that are before the current audio file in the first specified order. Thus, the second plurality of files may be selected to avoid repeating media that was already played out by the client device. Alternatively or additionally, the second plurality of audio files may include at least some audio files of the first plurality of audio files that are after the current audio file in the first specified order. In some cases, generating the second playlist may involve selecting, from the audio files in the first plurality of audio files that are after the current audio file in the first specified order, the second plurality of audio files. Thus, the second plurality of files may be selected to include at least some media that would have otherwise been played out due to traversal of the first playlist. Nonetheless, the second plurality of files might have no files in common with the first plurality of files.

In some embodiments, the audio files in the first plurality of audio files are associated with respective priorities. Generating the second playlist may involve selecting the second plurality of audio files from the audio files of the first plurality of audio files while giving preference to higher priority audio files over lower priority audio files. Audio files containing advertisements may be associated with higher priorities than audio files containing music, or vice versa.

Block 1208 may involve transmitting, over the wide area network, the second playlist to the client device. Reception of the second playlist at the client device may cause the audio player application to retrieve and play out the second plurality of audio files in the second specified order. Reception of the second playlist at the client device may also cause the audio player application to play out the second plurality of audio files after the audio player completes playout of the current audio file.

In some embodiments, the indication specifies a target duration, and generating second playlist may involve selecting the second plurality of audio files so that the second duration is within a threshold of the target duration. The threshold may be, for example, three minutes or less. Thus, the threshold may be 15 seconds or less, 30 seconds or less, 1 minute or less, 2 minutes or less, and so on. Additionally, if the indication specifies that the client device has activated a sleep timer with the target duration, and the second plurality of audio files may be selected based on preferences for one or more of (i) slow tempos, (ii) narrow dynamic ranges, or (iii) lower volumes.

The embodiment of FIG. 12 may be simplified by the removal of any one or more of the features shown therein. Further, this embodiment may be combined with features, aspects, and/or implementations of any of the previous figures or otherwise described herein.

7. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    generating, by a server device, a first playlist for a client device, wherein the first playlist includes references to a first plurality of audio files and has a first duration;
    transmitting, by the server device, the first playlist to the client device;
    receiving, by the server device, a target duration from the client device;
    in response to receiving the target duration, generating, by the server device, a second playlist, wherein the second playlist includes references to a second plurality of audio files and has a second duration that is: less than the first duration and within a threshold duration of the target duration; and
    transmitting, by the server device, the second playlist to the client device.

2. The method of claim 1, wherein the target duration is an estimated duration for the client device to reach a destination.

3. The method of claim 1, wherein reception of the first playlist at the client device causes an audio player application of the client device to retrieve and play out at least some of the first plurality of audio files.

4. The method of claim 3, wherein reception of the second playlist at the client device causes the audio player application to stop playing out audio files from the first plurality of audio files and to retrieve and play out at least some of the second plurality of audio files.

5. The method of claim 4, wherein causing the audio player application to stop playing out audio files from the first plurality of audio files comprises:
    causing the audio player application to, after playout of a current audio file being played out completes, stop playing out the audio files from the first plurality of audio files.

6. The method of claim 5, wherein the second duration is based on the target duration minus any time remaining for playout of the current audio file.

7. The method of claim 5, wherein the second plurality of audio files does not include any of the audio files of the first plurality of audio files that are before the current audio file in an ordering of the first plurality of audio files.

8. The method of claim 5, wherein the second plurality of audio files includes at least some audio files of the first plurality of audio files that are after the current audio file in an ordering of the first plurality of audio files.

9. The method of claim 1, wherein the threshold duration is three minutes or less.

10. The method of claim 1, wherein audio files in the first plurality of audio files are each associated with a higher priority or a lower priority, and wherein the second plurality of audio files includes audio files from the first plurality of audio files associated with the higher priority.

11. An article of manufacture including a non-transitory computer-readable medium, having stored thereon program instructions that, upon execution by a server device, cause the server device to perform operations comprising:
- generating a first playlist for a client device, wherein the first playlist includes references to a first plurality of audio files and has a first duration;
- transmitting the first playlist to the client device;
- receiving a target duration from the client device;
- in response to receiving the target duration, generating a second playlist, wherein the second playlist includes references to a second plurality of audio files and has a second duration that is: less than the first duration and within a threshold duration of the target duration; and
- transmitting the second playlist to the client device.

12. The article of manufacture of claim 11, wherein the target duration is an estimated duration for the client device to reach a destination.

13. The article of manufacture of claim 11, wherein reception of the first playlist at the client device causes an audio player application of the client device to retrieve and play out at least some of the first plurality of audio files.

14. The article of manufacture of claim 13, wherein reception of the second playlist at the client device causes the audio player application to stop playing out audio files from the first plurality of audio files and to retrieve and play out at least some of the second plurality of audio files.

15. The article of manufacture of claim 14, wherein causing the audio player application to stop playing out audio files from the first plurality of audio files comprises:
- causing the audio player application to, after playout of a current audio file being played out completes, stop playing out the audio files from the first plurality of audio files.

16. The article of manufacture of claim 15, wherein the second duration is based on the target duration minus any time remaining for playout of the current audio file.

17. The article of manufacture of claim 15, wherein the second plurality of audio files does not include any of the audio files of the first plurality of audio files that are before the current audio file in an ordering of the first plurality of audio files.

18. The article of manufacture of claim 15, wherein the second plurality of audio files includes at least some audio files of the first plurality of audio files that are after the current audio file in an ordering of the first plurality of audio files.

19. The article of manufacture of claim 11, wherein audio files in the first plurality of audio files are each associated with a higher priority or a lower priority, and wherein the second plurality of audio files includes audio files from the first plurality of audio files associated with the higher priority.

20. A server device comprising:
- a processor;
- memory; and
- program instructions, stored in the memory, that upon execution by the processor cause the server device to perform operations comprising:
  - generating a first playlist for a client device, wherein the first playlist includes references to a first plurality of audio files and has a first duration;
  - transmitting the first playlist to the client device;
  - receiving a target duration from the client device;
  - in response to receiving the target duration, generating a second playlist, wherein the second playlist includes references to a second plurality of audio files and has a second duration that is: less than the first duration and within a threshold duration of the target duration; and
  - transmitting the second playlist to the client device.

* * * * *